(12) United States Patent
Wada

(10) Patent No.: US 7,978,320 B2
(45) Date of Patent: Jul. 12, 2011

(54) LIGHT ANGLE DETECTION DEVICE, METHOD FOR FABRICATION THEREOF AND ELECTRONIC DEVICE EMPLOYING SAME

(75) Inventor: Hideo Wada, Nara (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 248 days.

(21) Appl. No.: 12/285,279

(22) Filed: Oct. 1, 2008

(65) Prior Publication Data

US 2009/0122301 A1 May 14, 2009

(30) Foreign Application Priority Data

Nov. 13, 2007 (JP) ................................. 2007-294567

(51) Int. Cl.
*G01B 11/26* (2006.01)
(52) U.S. Cl. ...... 356/138; 356/374; 356/28.5; 250/237 G
(58) Field of Classification Search .................. 356/138, 356/140, 141.1–141.5
See application file for complete search history.

(56) References Cited

U.S. PATENT DOCUMENTS

| | | | | |
|---|---|---|---|---|
| 4,410,270 A | * | 10/1983 | Zuckerman | 356/141.3 |
| 4,840,488 A | | 6/1989 | Kabaya et al. | |
| 5,000,564 A | * | 3/1991 | Ake | 356/3.16 |
| 5,026,153 A | * | 6/1991 | Suzuki et al. | 356/3.16 |
| 5,264,910 A | * | 11/1993 | Hill | 356/141.2 |
| 7,583,363 B2 | * | 9/2009 | Yuan | 356/3.01 |

FOREIGN PATENT DOCUMENTS

| | | |
|---|---|---|
| JP | 47-41866 | 12/1972 |
| JP | 62-150118 | 7/1987 |
| JP | 63-95306 | 4/1988 |
| JP | 63-217223 | 9/1988 |
| JP | 06-241757 A | 9/1994 |
| JP | 08-210825 A | 8/1996 |
| JP | 08-340124 A | 12/1996 |

\* cited by examiner

*Primary Examiner* — Hoa Pham
*Assistant Examiner* — Isiaka O Akanbi
(74) *Attorney, Agent, or Firm* — Birch, Stewart, Kolasch & Birch, LLP

(57) ABSTRACT

A light angle detection device according to an embodiment of the present invention includes a first light receiving lens, a first light sensing element, a second light receiving lens, and a second light sensing element. The first and second light receiving lenses and the first and second light sensing elements are disposed such that a first straight line passing through the center of the light receiving surface of the first light sensing element and the vertex of the first light receiving lens, a second straight line passing through the center of the light receiving surface of the second light sensing element and the vertex of the second light receiving lens, and a third straight line passing through the center of the light receiving surface of the first light sensing element and the center of the light receiving surface of the second light sensing element form an isosceles triangle.

13 Claims, 16 Drawing Sheets

LIGHT ANGLE DETECTION DEVICE, METHOD FOR FABRICATION THEREOF AND ELECTRONIC DEVICE EMPLOYING SAME

This application claims priority under 35 U.S.C. §119(a) on Japanese Patent Application No. 2007-294567 filed in Japan on Nov. 13, 2007, the entire contents of which are hereby incorporated by reference.

BACKGROUND OF THE INVENTION

1. Field of the Invention

The present invention relates to a light angle detection device that receives light signals emitted from a light source, such as a remote control transmitter etc. and detects the direction of the light source, a method for the fabrication thereof, and an electronic device employing the light angle detection device.

2. Description of the Related Art

Conventional devices of this kind can be roughly divided into the following three types. The first type is a device, in which a light signal is made incident upon multiple light sensing elements (PDs, etc.) and position sensors (PSDs) through small holes in a light blocking plate; the second type is a device, in which multiple light sensing elements are disposed at a slant and a directionality difference is detected from the respective sensed light intensities; and the third type is a device detecting the distribution of light intensity sensed by position sensors and solid-state image sensing devices (CCDs, CMOS', etc.).

For instance, a first conventional device is disclosed in JP6-241757A (hereinafter referred to as Patent Document 1), JP8-210825A (hereinafter referred to as Patent Document 2), and JP8-340124A (hereinafter referred to as Patent Document 3), in which a light signal is made incident upon multiple light sensing elements and position sensors through small holes in a light blocking plate, the position of incidence of the incident light is detected, and the direction of the light source is obtained based on the position of incidence. Moreover, as disclosed in JP8-264826A (hereinafter referred to as Patent Document 4), multiple light sensing elements are positioned behind a light blocking member, on both sides thereof, such that when a light signal is incident thereon, the position of the shadow of the light blocking member projected onto the light receiving surfaces of the light sensing elements is detected and the direction of the light source is obtained based on the position of the shadow of this light blocking member. In any case, the principle used is the same as that of a sundial, in other words, detecting and utilizing changes in the shadow of a light blocking member or incident light depending on the direction of the light source.

Furthermore, a second conventional device is disclosed, for instance, in JP1-13681A (hereinafter referred to as Patent Document 5) and Japanese Patent No. 3508714 (hereinafter referred to as Patent Document 6), where multiple light sensing elements are disposed such that the directionality of the respective light sensing elements is different, and the direction of the light source is obtained by comparing the light sensing outputs of the light sensing elements.

In addition, a third conventional device is disclosed, for instance, in JP9-49733A (hereinafter referred to as Patent Document 7) and JP6-241757A (hereinafter referred to as Patent Document 8), where a light signal is made incident upon multiple light sensing elements and position sensors through a light receiving lens, the position of incidence of the light signal and the focused light spot configuration are detected, and the direction of the light source is obtained based on the position of incidence and focused light spot configuration. Moreover, as disclosed in JP2007-13536A (hereinafter referred to as Patent Document 9), a light signal is made incident upon a solid-state image sensing device such as a CCD or a CMOS, etc., the pixel with the highest sensed light intensity of the solid-state image sensing device is detected, and the direction of the light source is obtained from the position of this pixel.

However, in the first conventional device (Patent Documents 1 to 4), despite the receipt of the luminous flux of a light signal radially spreading from a remote light source, the light signal was either made incident upon light sensing elements and position sensors through small holes or was blocked optically by a light blocking member and its shadow was detected by the light sensing elements, as a result of which the amount of light sensed by the light sensing elements and position sensors was small, their output levels were extremely low, and the sensitivity of detection was low.

Moreover, in the second conventional device (Patent Documents 5, 6), the luminous flux of the light signal radially spreading from a remote light source was received by the light sensing elements "as is", as a result of which the light receiving surface area of the light sensing elements had to be expanded in order to raise the light sensing output levels of the light sensing elements, which increased the cost and made the device larger in size. In addition, a high accuracy of positioning was required because the accuracy of detection is to a large extent controlled by the accuracy of light sensing element positioning on the inclined surfaces. In general, in a mechanized manufacturing process, it is extremely difficult to accurately perform positioning relative to inclined surface, although positioning relative to even surfaces can be performed with accuracy. Furthermore, it is evident that the efficiency and accuracy of manufacturing are very poor in case of manual manufacturing.

In addition, in the third conventional device (Patent Documents 7 to 9), a light signal is collected using a light receiving lens and is made incident upon multiple light sensing elements, position sensors, and solid-state image sensing devices, thereby causing their light sensing outputs to rise. However, when multiple light sensing elements were used, the accuracy of detection could not be raised if the number of the light sensing elements was not increased, which increased the cost and made the device larger in size. Moreover, when position sensors and solid-state image sensing devices were used, the unit price of the elements was high and it was impossible to avoid a cost increase.

SUMMARY OF THE INVENTION

The present invention was made with account taken of these circumstances, and it is an object of the invention to provide an inexpensive and small light angle detection device with a high sensitivity of detection, a method for the fabrication thereof, and an electronic device employing the same.

A light angle detection device of the present invention is configured such that a first light receiving unit that has a first light receiving lens collecting incident light and a first light sensing element receiving the incident light collected by the first light receiving lens, and a second light receiving unit that has a second light receiving lens collecting incident light and a second light sensing element receiving the incident light collected by the second light receiving lens are arranged side-by-side, the first light receiving lens, the first light sensing element, the second light receiving lens, and the second light sensing element are disposed such that a first straight line passing through a center of a light receiving surface of the first light sensing element and a vertex of the first light receiving lens, a second straight line passing through a center of a light receiving surface of the second light sensing element and a vertex of the second light receiving lens, and a third straight line passing through the center of the light receiving surface of the first light sensing element and the center of the light receiving surface of the second light sensing element form an isosceles triangle, in which the third straight line serves as a base, and the light sensing outputs of the first and second light sensing elements change depending on the incidence angle of the incident light relative to the third straight line.

In such a configuration, the light sensing output levels of the first and second light sensing elements change depending on the direction of the light source when incident light from the light source is incident upon the first light sensing element through the first light receiving lens and, at the same time, is incident upon the second light sensing element through the second light receiving lens. Therefore, the direction of the light source can be obtained based on the light sensing output levels of the first and second light sensing elements. Moreover, as a result of using the first and second light receiving lenses, the incident light can be collected and made incident upon the first and second light sensing elements, thereby increasing the amount of light sensed by the first and second light sensing elements and making it possible to raise the sensitivity of detection of the first and second light sensing elements. Furthermore, the cost of the device can be minimized because two photodiodes etc. can be utilized as the first and second light sensing elements.

Moreover, in the light angle detection device of the present invention, the first and second light sensing elements may be encapsulated in a same light transmitting resin.

This configuration has the benefit of permitting miniaturization of the device because the first and second light sensing elements are encapsulated in a same light transmitting resin.

Moreover, in the light angle detection device of the present invention, the first and second light receiving lenses may be molded from a portion of the light transmitting resin encapsulating the first and second light sensing elements.

This configuration has the benefit of reducing the number of components and the cost because a portion of the light transmitting resin is molded into first and second light receiving lenses.

Moreover, the light angle detection device of the present invention may employ a configuration, in which a light blocking unit is provided between the first and second light receiving lenses, with the light blocking unit preventing light that does not pass through the first light receiving lens from being incident upon the first light sensing element and light that does not pass through the second light receiving lens from being incident upon the second light sensing element.

As a result of providing a light blocking unit between the first and second light receiving lenses, this configuration has the benefit of preventing incident light passing through the first light receiving lens from being incident upon the second light sensing element and producing noise components as well as the benefit of preventing incident light passing through the second light receiving lens from being incident upon the first light sensing element and producing noise components. Therefore, only effective incident light passing through the first light receiving lens is incident upon the first light sensing element, and only effective incident light passing through the second light receiving lens is incident upon the second light sensing element. In other words, light deviating from the predefined directionality of the first light sensing element is not incident upon the first light sensing element and light deviating from the predefined directionality of the second light sensing element is not incident upon the second light sensing element.

Moreover, in the light angle detection device of the present invention, a normal to the light receiving surface of the first light sensing element, a major axis of the first light receiving lens, a normal to the light receiving surface of the second light sensing element, and a major axis of the second light receiving lens may be parallel to each other and perpendicular to the third straight line.

Moreover, in the light angle detection device of the present invention, a normal to the light receiving surface of the first light sensing element and a normal to the light receiving surface of the second light sensing element may be parallel to each other and perpendicular to the third straight line, the major axis of the first light receiving lens and the major axis of the second light receiving lens may be aligned, respectively, with the first and second straight lines, and a straight line connecting the respective vertices of the first and second light receiving lenses may be parallel to the third straight line.

Moreover, in the light angle detection device of the present invention, a normal passing through the center of the light receiving surface of the first light sensing element and a major axis of the first light receiving lens may be both aligned with the first straight line and a normal passing through the center of the light receiving surface of the second light sensing element and a major axis of the second light receiving lens may be both aligned with the second straight line.

Moreover, in the light angle detection device of the present invention, the first light sensing element and the first light receiving lens, as well as the second light sensing element and the second light receiving lens, may be placed on respective lead frames and the lead frames may be disposed such that the respective normals to these lead frames are aligned with the first and second straight lines.

Moreover, in the light angle detection device of the present invention, there may be provided a substrate parallel to the third straight line and the lead frames may be disposed on the substrate with respective spacers sandwiched between the lead frames and the substrate so as to set the incline of each lead frame with respect to the substrate.

An inventive fabrication method for a light angle detection device is a fabrication method for a light angle detection device, which is adapted to be provided with a first light receiving unit having a first light receiving lens collecting incident light and a first light sensing element receiving the incident light collected by the first light receiving lens and a second light receiving unit having a second light receiving lens collecting incident light and a second light sensing element receiving the incident light collected by the second light receiving lens, and in which the first light receiving lens, the first light sensing element, the second light receiving lens, and the second light sensing element are disposed such that a first straight line passing through a center of a light receiving surface of the first light sensing element and a vertex of the first light receiving lens, a second straight line passing through a center of a light receiving surface of the second light sensing element and a vertex of the second light receiving lens, and a third straight line passing through the center of the light receiving surface of the first light sensing element and the center of the light receiving surface of the second light sensing element form an isosceles triangle having the third straight line as its base, and the light sensing outputs of the first and second light sensing elements change depending on the incidence angle of the incident light relative to the third straight line, the method including the steps of: placing and die-bonding multiple pairs of the first and second light sensing elements on a lead frame or substrate; for each pair of the first and second light sensing elements, connecting the first and second light sensing elements to the lead frame or substrate by wire-bonding; for each pair of the first and second light sensing elements, using a light transmitting resin to encapsulate the first and second light sensing elements in resin and molding the first and second light receiving lenses using a portion of the light transmitting resin; and for each pair of the first and second light sensing elements, cutting the lead frame or substrate apart to produce light angle detection devices.

Furthermore, the inventive fabrication method for a light angle detection device may be a fabrication method for a light angle detection device, which is adapted to be provided with a first light receiving unit having a first light receiving lens collecting incident light and a first light sensing element receiving the incident light collected by the first light receiving lens and a second light receiving unit having a second light receiving lens collecting incident light and a second light sensing element receiving the incident light collected by the second light receiving lens, and in which the first light receiving lens, the first light sensing element, the second light receiving lens, and the second light sensing element are disposed such that a first straight line passing through a center of a light receiving surface of the first light sensing element and a vertex of the first light receiving lens, a second straight line passing through a center of a light receiving surface of the second light sensing element and a vertex of the second light receiving lens, and a third straight line passing through the center of the light receiving surface of the first light sensing element and the center of the light receiving surface of the second light sensing element form an isosceles triangle having the third straight line as its base, and the light sensing outputs of the first and second light sensing elements change depending on the incidence angle of the incident light relative to the third straight line, the method including the steps of: placing and die-bonding multiple pairs of the first and second light sensing elements on a lead frame; for each pair of the first and second light sensing elements, connecting the first and second light sensing elements to the lead frame by wire-bonding; bending the lead frame such that both a normal passing through the center of the light receiving surface of the first light sensing element and a major axis of the first light receiving lens are aligned with the first straight line and both a normal passing through the center of the light receiving surface of the second light sensing element and a major axis of the second light receiving lens are aligned with the second straight line; for each pair of the first and second light sensing elements, using a light transmitting resin to encapsulate the first and second light sensing elements in resin and molding the first and second light receiving lenses using a portion of the light transmitting resin; cutting the tie bars of the lead frame; and for each pair of the first and second light sensing elements, cutting the lead frame apart to produce light angle detection devices.

Alternatively, the inventive fabrication method for a light angle detection device may be a fabrication method for a light angle detection device, which is adapted to be provided with a first light receiving unit having a first light receiving lens collecting incident light and a first light sensing element receiving the incident light collected by the first light receiving lens and a second light receiving unit having a second light receiving lens collecting incident light and a second light sensing element receiving the incident light collected by the second light receiving lens, and in which the first light receiving lens, the first light sensing element, the second light receiving lens, and the second light sensing element are disposed such that a first straight line passing through a center of a light receiving surface of the first light sensing element and a vertex of the first light receiving lens, a second straight line passing through a center of a light receiving surface of the second light sensing element and a vertex of the second light receiving lens, and a third straight line passing through the center of the light receiving surface of the first light sensing element and the center of the light receiving surface of the second light sensing element form an isosceles triangle having the third straight line as its base, and the light sensing outputs of the first and second light sensing elements change depending on the incidence angle of the incident light relative to the third straight line, the method including the steps of: placing and die-bonding multiple light sensing elements on a lead frame; for each light sensing element, connecting the light sensing element to the lead frame by wire-bonding; for each light sensing element, using a light transmitting resin to encapsulate the light sensing element in resin and molding a light receiving lens using a portion of the light transmitting resin; cutting the lead frame apart to separate it into multiple lead frames so as to include a light sensing element and a light receiving lens in the respective separated lead frames; and producing the light angle detection device by combining two separated lead frames and using the light sensing elements and the light receiving lenses of these lead frames as the first light sensing element, the second light sensing element, the first light receiving lens, and the second light receiving lens of the light angle detection device.

The fabrication method of the present invention described above makes it possible to more efficiently mass-produce the light angle detection device of the present invention.

The electronic device of the present invention makes use of the above-described light angle detection device of the present invention.

The electronic devices of the present invention include devices receiving light signals emitted from the light sources of remote control transmitters, etc., various household electric appliances, and the like. More specifically, the light angle detection device of the present invention is installed in air conditioning systems such as fans, air conditioners, and heaters and is used to detect, on the air conditioning system side, the direction of a remote control transmitter operator and create an optimum air-conditioned space for the operator in the detected direction. Moreover, the light angle detection device of the present invention may be installed in audio equipment such as speaker systems etc. in order to detect the direction of the listeners and use the detected direction to produce an optimum sound field for the listeners. Alternatively, if the light angle detection device of the present invention is installed in a camera, it will be possible to detect the direction of a remote control transmitter operator, orient the camera in the detected direction, adjust the exposure and focus, etc. in this direction, and capture an image of the operator. In addition, significant effects can be obtained if the light angle detection device of the present invention is installed in an electronic device and the operational state of the electronic device is controlled depending on the direction of the operator of the remote control transmitter.

DETAILED DESCRIPTION OF THE INVENTION

Below, some embodiments of the present invention are explained in detail by referring to the accompanying drawings.

Embodiment 1

Figure 1A:
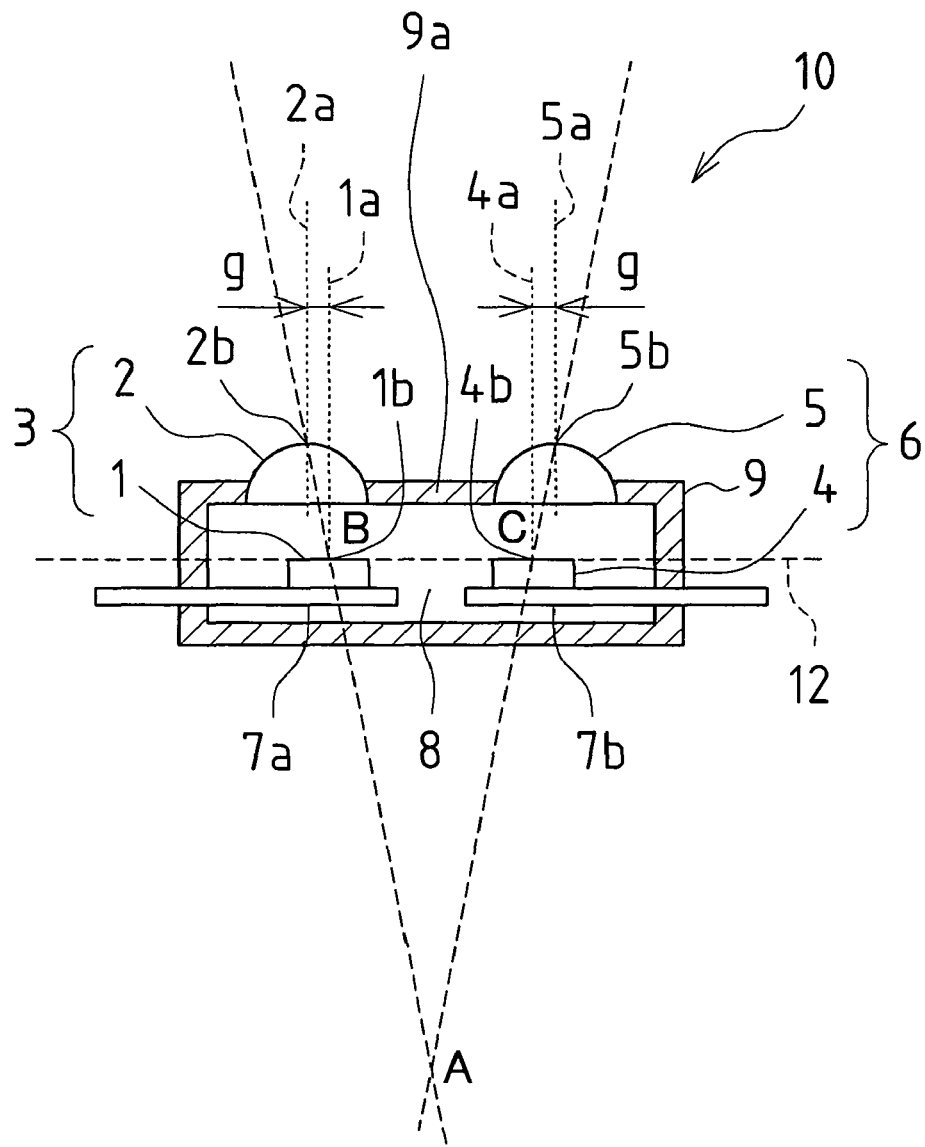
FIG. 1A is a cross sectional view schematically illustrating the configuration of a light angle detection device according to Embodiment 1 of the present invention.
Figure 1B:
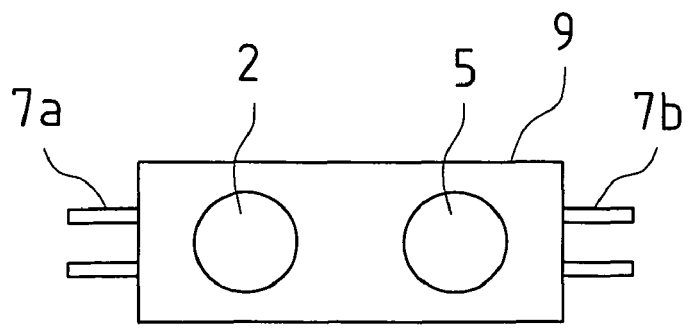
FIG. 1B is a plan view illustrating the light angle detection device of FIG. 1A as seen from above.
Figure 1C:
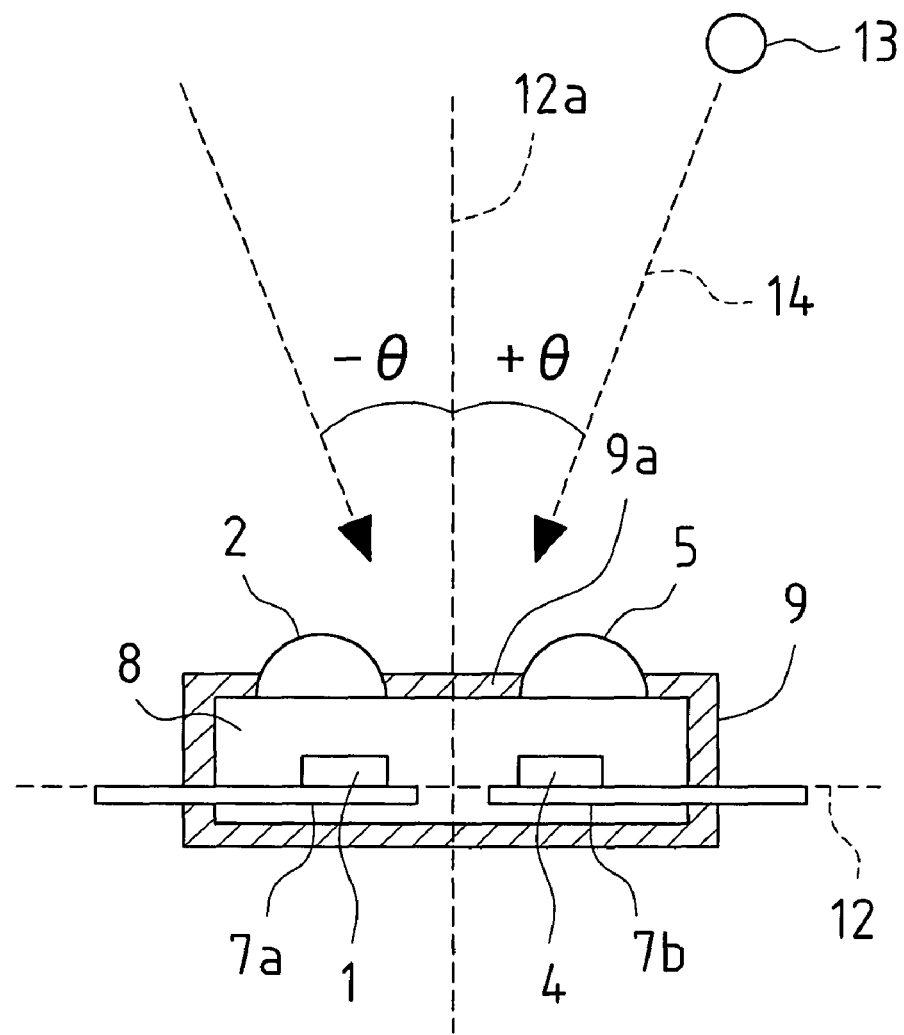
FIG. 1C is an explanatory diagram used to explain a reference plane that defines the incidence angle of light incident upon the light angle detection device shown in FIG. 1A.

FIGS. 1A to 1C are views illustrating the light angle detection device according to Embodiment 1 of the present invention. FIG. 1A is a cross sectional view schematically illustrating the configuration of a light angle detection device according to Embodiment 1 of the present invention, FIG. 1B is a plan view illustrating the light angle detection device of FIG. 1A as seen from above, and FIG. 1C is an explanatory diagram used to explain a reference plane that defines the incidence angle of light incident upon the light angle detection device shown in FIG. 1A.

In the light angle detection device 10 of the present embodiment, a first light sensing element 1 and a first light receiving lens 2 make up a first light receiving unit 3 while a second light sensing element 4 and a second light receiving lens 5 make up a second light receiving unit 6. The first and second light sensing elements 1, 4 are identical (for instance, photo diodes) and possess correspondingly identical characteristics. The first and second light receiving lenses 2, 5 are identical and possess correspondingly identical characteristics.

The first light sensing element 1 and second light sensing element 4 are placed on the die-bonding portions of a pair of lead frames 7a, 7b, and the first and second light sensing elements 1, 4 and the die-bonding portions of the lead frames 7a, 7b are encapsulated in light transmitting resin 8. The first light receiving lens 2, which is molded from a portion of the light transmitting resin 8, is provided above the first light sensing element 1 and, in a similar manner, the second light receiving lens 5, which is molded from a portion of the light transmitting resin 8, is provided above the second light sensing element 4.

The outer surface of the light transmitting resin 8, with the exception of the locations of the first and second light receiving lenses 2, 5, is covered by a light blocking resin 9, with this light blocking resin 9 preventing extraneous scattered light from entering from the outer surface of the light transmitting resin 8. Moreover, as a result of a central portion 9a of the light blocking resin 9 being interposed between the first and second light receiving lenses 2, 5, incident light passing through the first light receiving lens 2 is not incident upon the second light sensing element 4 and does not produce noise components. In addition, incident light passing through the second light receiving lens 5 is not incident upon the first light sensing element 1 and does not produce noise components. Therefore, only effective incident light passing through the first light receiving lens 2 is incident upon the first light sensing element 1 and only effective incident light passing through the second light receiving lens 5 is incident upon the second light sensing element 4. In other words, light deviating from the predefined directionality of the first light sensing element 1 is not incident upon the first light sensing element 1 and light deviating from the predefined directionality of the second light sensing element 4 is not incident upon the second light sensing element 4.

The light transmitting resin 8, which is formed by molding in a mold, is molded after the first and second light sensing elements 1, 4 and the die-bonding portions of the lead frames 7a, 7b are placed in the mold space of the mold. Moreover, a portion of the light transmitting resin 8 is molded in the mold to produce the first and second light receiving lenses 2, 5. The light blocking resin 9, which can be formed by molding in a mold, is molded after the light transmitting resin 8 is placed in the mold space of the mold. It should be noted that, instead of the light blocking resin 9, the light transmitting resin 8 may be covered using a metal or other housing possessing light-blocking properties.

In the thus configured light angle detection device 10, as shown in FIG. 1C, the top surface of the die bonding portions of the respective lead frames 7a, 7b, which carry the first light sensing element 1 and second light sensing element 4, is used as a reference plane 12, with the first and second light sensing elements 1, 4 and the first and second light receiving lenses 2, 5 disposed so as to permit detection of the angles of incidence ±θ of incident light 14 relative to the normal 12a to the reference plane 12 passing midway between the light sensing elements 1 and 4 based on the light sensing outputs of the first and second light sensing elements 1, 4 when incident light 14 from an external light source 13 is received by the first and second light sensing elements 1, 4 through the first and second light receiving lenses 2, 5.

Namely, if a straight line passing through a center 1b of a light receiving surface of the first light sensing element 1 and a vertex 2b of the first light receiving lens 2 is designated as a first straight line AB, a straight line passing through a center 4b of a light receiving surface of the second light sensing element 4 and a vertex 5b of the second light receiving lens 5 is designated as a second straight line AC, and a straight line passing through the center 1b of the light receiving surface of the first light sensing element 1 and the center 4b of the light receiving surface of the second light sensing element 4 is designated as a third straight line BC, the first and second light sensing elements 1, 4 and the first and second light receiving lenses 2, 5 are disposed such that the first straight line AB, second straight line AC, and third straight line BC define an isosceles triangle, in which the third straight line BC serves as a base.

Specifically, as shown in FIG. 1A, the orientation of the first and second light receiving lenses 2, 5 is set such that major axes 2a and 5a of the first and second light receiving lenses 2, 5 are perpendicular to the reference plane 12. Moreover, the orientation of the first and second light sensing elements 1, 4 is set such that the normal 1a to the light receiving surface of the first light sensing element 1 and the normal 4a to the light receiving surface of the second light sensing element 4 are perpendicular to the reference plane 12. In addition, the first and second light sensing elements 1, 4 and the first and second light receiving lenses 2, 5 are disposed by displacing the vertex 2b of the first light receiving lens 2 a fixed distance g to the left of the center 1b of the light receiving surface of the first light sensing element 1 in parallel to the reference plane 12 and displacing the vertex 5b of the second light receiving lens 5 a fixed distance g to the right of the center 4b of the light receiving surface of second light sensing element 4 in parallel to the reference plane 12, such that the distance between the vertices of the first and second light receiving lenses 2, 5 is made wider by 2 g than the distance between the centers of the light receiving surfaces of the first and second light sensing elements 1, 4. Moreover, the first and second light sensing elements 1, 4 and the first and second light receiving lenses 2, 5 are positioned such that the height of the light receiving surfaces of the first and second light sensing elements 1, 4 relative to the reference plane 12 is the same, and the height of the vertices of the first and second light receiving lenses 2, 5 relative to the reference plane 12 is the same as well.

In such an arrangement, when the light source 13 is located, for instance, on the normal 12a to the reference plane 12 (which bisects the angle at the vertex A of the isosceles triangle) passing midway between the light sensing elements 1, 4, the angle of incidence ±θ of incident light 14 relative to the normal 12a to the reference plane 12 is zero, the amount of the incident light 14 sensed on the light receiving surfaces of the first and second light sensing elements 1, 4 is the same, and the light sensing output levels of the first and second light sensing elements 1, 4 are the same.

Moreover, when the light source 13 deviates from the normal 12a and approaches the first straight line AB and the angle of incidence |−θ| of the incident light 14 increases, the path of incidence of the incident light 14 from the first light receiving lens 2 to the first light sensing element 1 approaches a straight line, the amount of light sensed by the first light sensing element 1 increases, the light sensing output of the first light sensing element 1 rises. Conversely, the path of incidence of the incident light 14 from the second light receiving lens 5 to the second light sensing element 4 is progressively bent, the amount of light sensed by the second light sensing element 4 decreases, and the light sensing output of the second light sensing element 4 drops. In addition, when the light source 13 is located on the first straight line AB, the path of incidence of the incident light 14 from the first light receiving lens 2 to the first light sensing element 1 becomes a straight line, the amount of light sensed by the first light sensing element 1 reaches its maximum and the light sensing output of the first light sensing element 1 reaches its maximum as well. When the light source 13 deviates further from the first straight line AB away from the normal 12a and the angle of incidence |−θ| of the incident light 14 increases even more, the path of incidence of the incident light 14 from the first light receiving lens 2 to the first light sensing element 1 is bent, the amount of light sensed by the first light sensing element 1 decreases, and the light sensing output of the first light sensing element 1 starts dropping.

In a similar manner, when the light source 13 deviates from the normal 12a and approaches the second straight line AC and the angle of incidence |+θ| of the incident light 14 increases, the amount of light sensed by the second light sensing element 4 increases and the light sensing output of the second light sensing element 4 rises. Conversely, the amount of light sensed by the first light sensing element 1 decreases and the light sensing output of the first light sensing element 1 drops. In addition, when the light source 13 is located on the second straight line AC, the amount of light sensed by the second light sensing element 4 reaches its maximum and the light sensing output of the second light sensing element 4 reaches its maximum as well. When the light source 13 deviates further from the second straight line AC away from the normal 12a and the angle of incidence |+θ| of the incident light 14 increases even more, the amount of light sensed by the second light sensing element 4 decreases, and the light sensing output of the second light sensing element 4 starts dropping.

Figure 2A:
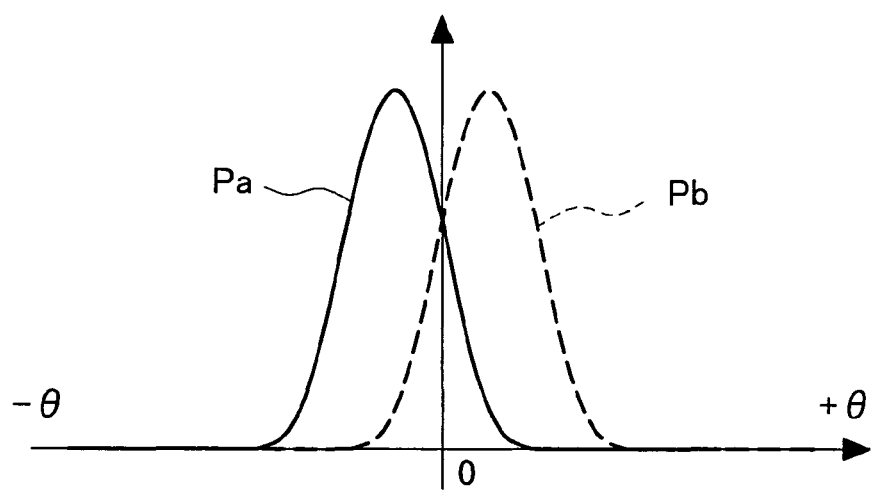
FIG. 2A is a graph illustrating changes in the light sensing outputs of the first and second light sensing elements depending on the incidence angle of incident light in the light angle detection device shown in FIG. 1A.

FIG. 2A is a graph illustrating changes in the light sensing outputs of the first and second light sensing elements 1, 4 depending on the incidence angle ±θ of the incident light 14. As evidenced by the graph, when the angle of incidence ±θ of the incident light 14 is zero, the light sensing output levels Pa, Pb of the first and second light sensing elements 1, 4 become the same. When the angle of incidence |−θ| of the incident light 14 increases and the light source 13 is located on the first straight line AB, the light sensing output Pa of the first light sensing element 1 reaches its maximum. Moreover, when the angle of incidence |+θ| of the incident light 14 increases and the light source 13 is located on the second straight line AC, the light sensing output Pb of the second light sensing element 4 reaches its maximum.

Figure 2B:
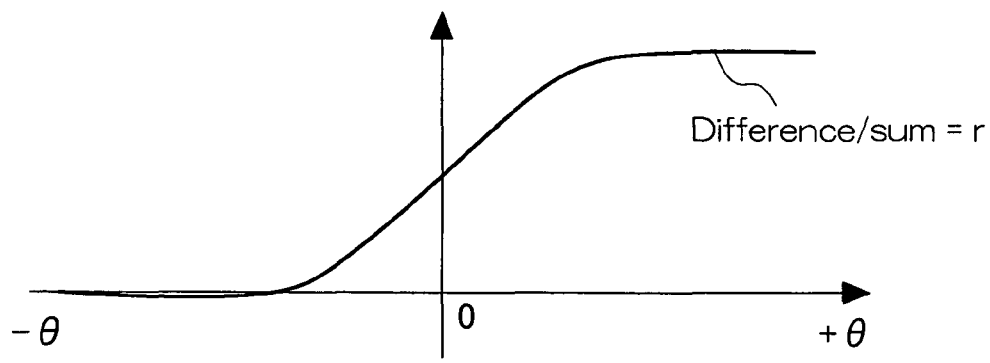
FIG. 2B is a graph illustrating the ratio between the difference and the sum of the light sensing outputs of the first and second light sensing elements vs. the incidence angle of the incident light in the light angle detection device shown in FIG. 1A.

In addition, when the difference and sum of the light sensing outputs of the first and second light sensing elements 1, 4 are obtained and the ratio r between the difference and the sum is determined, this ratio r changes as shown in the graph of FIG. 2B. As evidenced by the graph, the ratio r between the difference and the sum of the light sensing outputs of the first and second light sensing elements 1, 4 is substantially proportional to the angle of incidence ±θ in a fixed range of the incidence angle ±θ centering on the angle of incidence θ=0 of the incident light 14. Therefore, if the ratio r between the difference and the sum of the light sensing outputs of the first and second light sensing elements 1, 4 is obtained, then it will be possible to obtain the angle of incidence ±θ of the incident light 14, that is, the direction of the light source 13.

Thus, in the present embodiment, the direction of the light source 13 can be obtained based on the light sensing outputs of the first and second light sensing elements 1, 4. Moreover, since the incident light 14 is collected by the first and second light receiving lenses 2, 5 and made incident upon the first and second light sensing elements 1, 4, even if the incident light 14 from the light source 13 is diffuse light, the amount of light sensed by the first and second light sensing elements 1, 4 does not significantly decrease, and it is possible to obtain the light sensing outputs of the first and second light sensing elements 1, 4 necessary for signal processing and detect the direction of the remote light source 13 with accuracy. In addition, there is no increase in cost because only two first and second light sensing elements 1, 4 are used and there is no need to utilize expensive PSDs and the like.

Moreover, since the first and second light sensing elements 1, 4 are encapsulated in a single body of light transmitting resin 8, as shown in FIG. 1A, the space occupied by the light transmitting resin can be reduced in comparison with the configuration, in which the light sensing elements 1, 4 are separately encapsulated in resin, which, consequently, makes it possible to miniaturize the light angle detection device 10. Moreover, cost increases can be minimized because the manufacturing process is simplified and the amount of light transmitting resin 8 and light blocking resin 9 used can be reduced in comparison with the configuration, in which the first and second light sensing elements 1, 4 are encapsulated in resin separately.

Moreover, since the first and second light sensing elements 1, 4 are encapsulated in the light transmitting resin 8 and a portion of the light transmitting resin 8 is used to mold the first and second light receiving lenses 2, 5, when the first and second light sensing elements 1, 4 are positioned inside the mold used for the light transmitting resin 8, the first and second light sensing elements 1, 4 can be positioned with respect to the first and second light receiving lenses 2 and 5, the positioning of the first and second light sensing elements 1, 4 is facilitated, and a high positioning accuracy can be implemented. In addition, the first and second light receiving lenses 2, 5 do not have to be separately installed and a reduction in the number of components and cost can be achieved.

Moreover, since the outer surface of the light transmitting resin 8, with the exception of the locations of the first and second light receiving lenses 2, 5, is covered by the light blocking resin 9, the incident light 14 from the light source 13 necessarily passes through the first and second light receiving lenses 2, 5 and is respectively incident upon the first and second light sensing elements 1, 4. Moreover, no extraneous scattered light is incident upon the first and second light sensing elements 1, 4, which raises the accuracy of detection of the angle of incidence θ of the incident light 14 by the first and second light sensing elements 1, 4, i.e. the accuracy of detection of the direction of the light source 13.

Figure 3A:
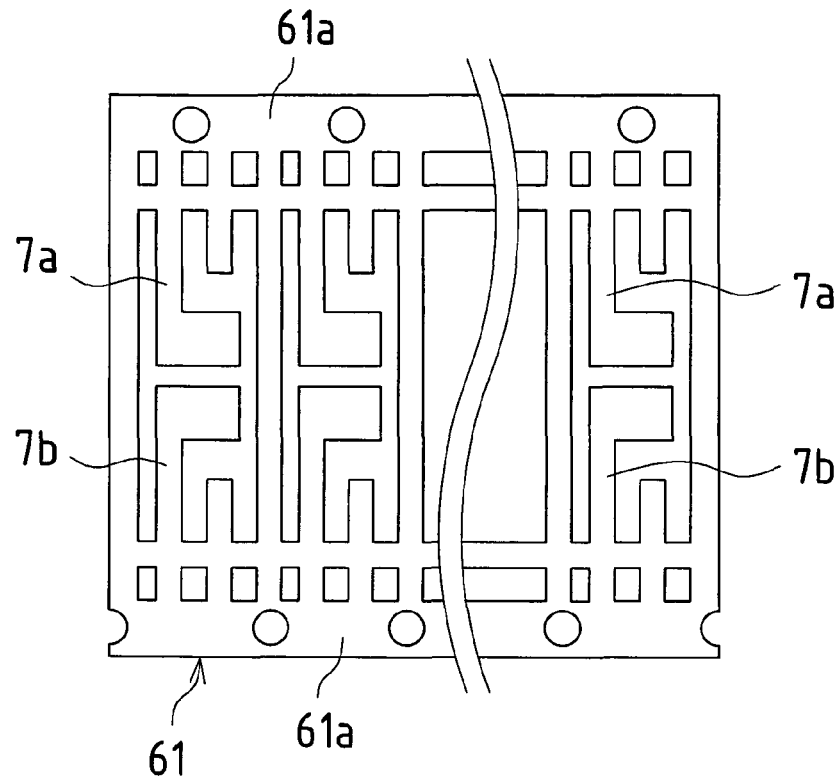
FIG. 3A is a diagram used to explain the fabrication method used in Embodiment 1 of the present invention.
Figure 3B:
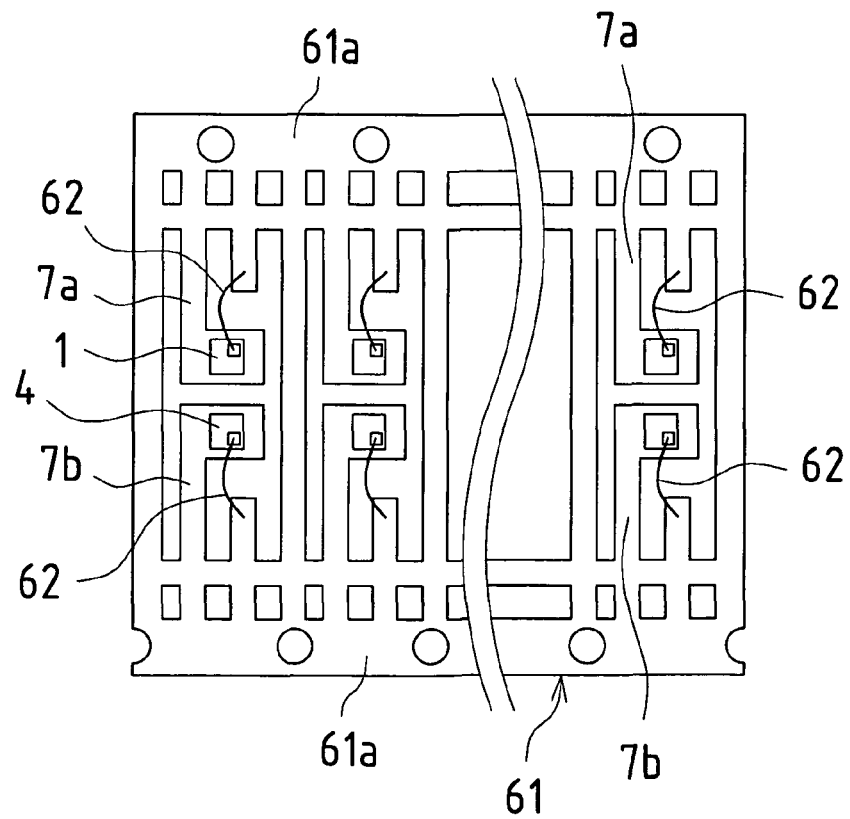
FIG. 3B is a diagram used to explain the fabrication method used in Embodiment 1 of the present invention.
Figure 3C:
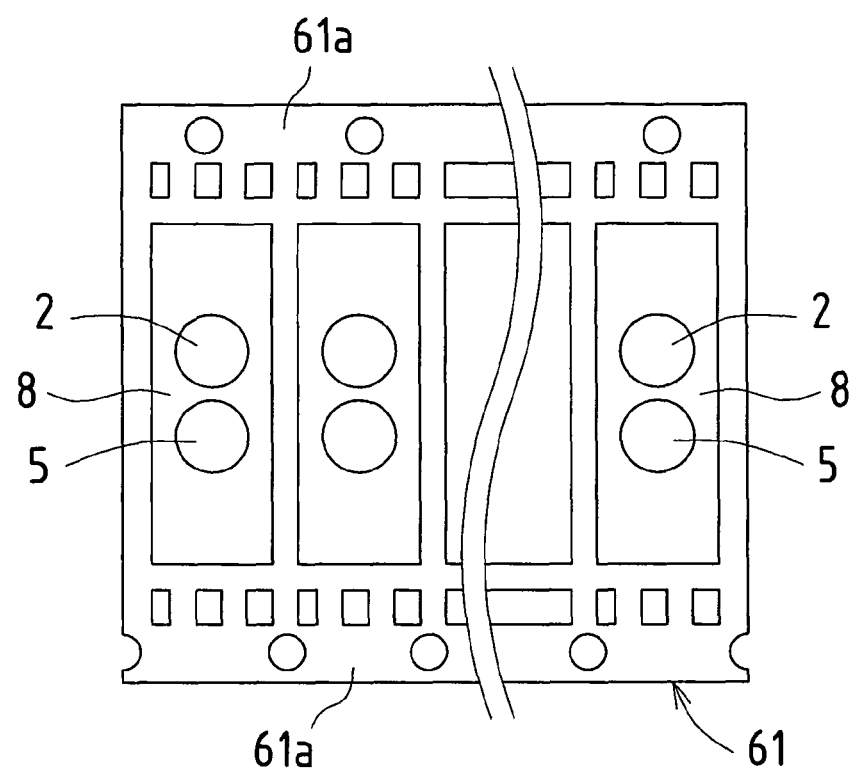
FIG. 3C is a diagram used to explain the fabrication method used in Embodiment 1 of the present invention.

The method of fabrication of the light angle detection device of the present embodiment is explained next. FIGS. 3A to 3C are explanatory diagrams used to explain the light angle detection device fabrication method of the present embodiment.

In the fabrication method of the present embodiment, a lead frame 61, which contains multiple pairs of lead frames 7a, 7b shown in FIG. 3A, is used to simultaneously fabricate multiple light angle detection devices 10. In the lead frame 61, multiple pairs of lead frames 7a, 7b are arranged in the lateral direction, with the ends of each pair of lead frames 7a, 7b connectedly supported by tie bars 61a.

As shown in FIG. 3B, in each single pair of lead frames 7a, 7b, first and second light sensing elements 1, 4 are die-bonded to the die-bonding portions of the lead frames 7a, 7b, with the first and second light sensing elements 1, 4 connected to the lead frames 7a, 7b by the respective bonding wires 62.

Subsequently, the lead frame 61 is positioned in a mold (not shown). At such time, the first and second light sensing elements 1, 4 carried by the die-bonding portions of the lead frames 7a, 7b for each pair of lead frames 7a, 7b are positioned inside the mold space of the mold. Heat-liquefied light transmitting resin is then poured into the mold space of the mold to form light transmitting resin 8 encapsulating the first and second light sensing elements 1, 4 (transfer molding). At such time, a portion of the light transmitting resin 8 is molded in the mold to produce first and second light receiving lenses 2, 5.

Furthermore, after the light transmitting resin 8 solidifies, the tie bars 61a of the lead frame 61 are cut off and the lead frame 61 is separated into light transmitting resin units 8 comprising the first and second light sensing elements 1, 4.

Finally, the light transmitting resin units 8 are put inside another mold (not shown), the light transmitting resin units 8 are positioned in the mold space of the other mold, and heat-liquefied light blocking resin is poured into the mold space of the other mold to form the light blocking resin 9 such that the outer surface of the light transmitting resin 8, with the exception of the locations of the first and second light receiving lenses 2, 5, is covered with light blocking resin 9 to yield light angle detection devices 10.

In the fabrication method of the present embodiment, most steps involve handling the flat plate-shaped lead frame 61, which permits easy implementation of automatic processing, allows for a large number of devices to be manufactured within a short time period, and makes it possible to provide light angle detection devices in a less expensive manner.

It should be noted that, instead of the light blocking resin 9, the light transmitting resin 8 may be covered using a metal or other housing possessing light-blocking properties. Moreover, instead of the lead frame 61, the light angle detection devices 10 can be manufactured by a similar fabrication method using a printed substrate having the same wiring pattern as the frame pattern of the lead frame 61.

Embodiment 2

Figure 4A:
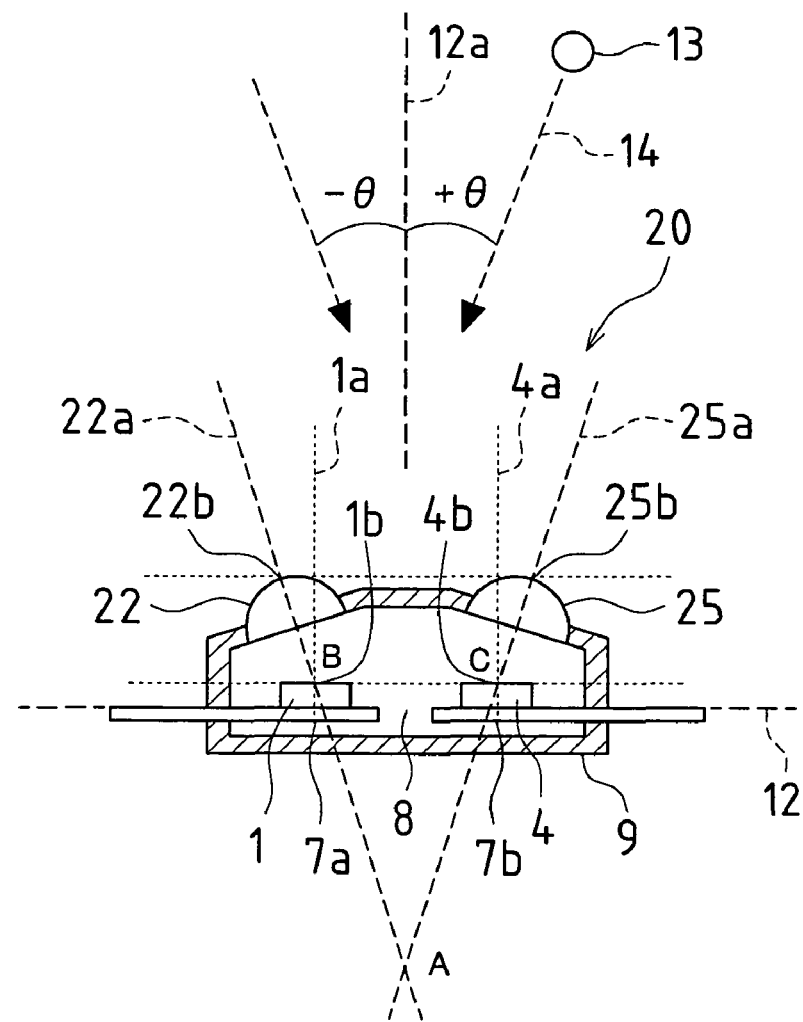
FIG. 4A is a cross sectional view schematically illustrating the configuration of a light angle detection device according to Embodiment 2 of the present invention.
Figure 4B:
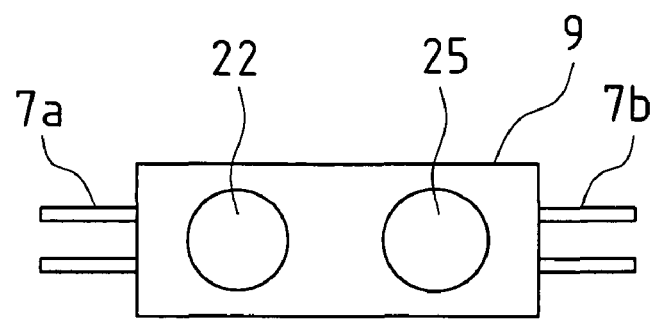
FIG. 4B is a plan view illustrating the light angle detection device of FIG. 4A as seen from above.

FIGS. 4A to 4B are diagrams illustrating a light angle detection device according to Embodiment 2 of the present invention. FIG. 4A is a cross sectional view schematically illustrating the configuration of the light angle detection device according to Embodiment 2 of the present invention and FIG. 4B is a plan view illustrating the light angle detection device of FIG. 4A as seen from above. It should be noted that, in FIGS. 4A to 4B, parts performing the same action as in the light angle detection device illustrated in FIGS. 1A to 1C are assigned the same numerals.

In the light angle detection device 20 of the present embodiment, the orientation of the first and second light receiving lenses 22, 25 is different from the orientation of the first and second light receiving lenses 2, 5 of the light angle detection device 10 of Embodiment 1 illustrated in FIGS. 1A to 1C. Specifically, the orientation of the first and second light receiving lenses 22, 25 is set such that major axes 22a, 25a of the first and second light receiving lenses 22, 25 are aligned with the first and second straight lines AB, AC of the two equal sides of the isosceles triangle. Just as the first and second light receiving lenses 2, 5 of the light angle detection device 10 of Embodiment 1, the first and second light receiving lenses 22, 25 are obtained by molding a portion of the light transmitting resin 8 and have correspondingly identical characteristics.

In this light angle detection device 20, the top surface of the die bonding portions of the lead frames 7a, 7b is used as a reference plane 12, with the first and second light sensing elements 1, 4 and the first and second light receiving lenses 22, 25 disposed so as to permit detection of the angle of incidence ±θ of incident light 14 relative to the normal 12a to the reference plane 12 passing midway between the light sensing elements 1, 4 based on the light sensing outputs of the first and second light sensing elements 1, 4 when incident light 14 from an external light source 13 is received by the first and second light sensing elements 1, 4 through the first and second light receiving lenses 22, 25.

Namely, the first and second light sensing elements 1, 4 and the first and second light receiving lenses 22, 25 are disposed such that a first straight line AB passing through a center 1b of a light receiving surface of the first light sensing element 1 and a vertex 22b of the first light receiving lens 22, a second straight line AC passing through a center 4b of a light receiving surface of the second light sensing element 4 and a vertex 25b of the second light receiving lens 25, and a third straight line BC passing through the center 1b of the light receiving surface of the first light sensing element 1 and the center 4b of the light receiving surface of the second light sensing element 4 define an isosceles triangle, in which the third straight line BC serves as a base.

Specifically, the orientation of the first and second light sensing elements 1, 4 is set such that the normal 1a to the light receiving surface of the first light sensing element 1 and the normal 4a to the light receiving surface of the second light sensing element 4 are perpendicular to the reference plane 12. Moreover, the first and second light sensing elements 1, 4 and the first and second light receiving lenses 22, 25 are positioned such that the height of the light receiving surfaces of the first and second light sensing elements 1, 4 relative to the reference plane 12 is the same, and the height of the vertices of the first and second light receiving lenses 22, 25 relative to the reference plane 12 is the same as well. In addition, as previously mentioned, the major axes 22a, 25a of the first and second light receiving lenses 22, 25 are aligned with the first and second straight lines AB, AC of the two equal sides of the isosceles triangle.

In such an arrangement, when the light source 13 is located on the normal 12a to the reference plane 12 (which bisects the angle at the vertex A of the isosceles triangle) passing midway between the light sensing elements 1, 4, the angle of incidence ±θ of incident light 14 relative to the normal 12a to the reference plane 12 is zero and the amount of the incident light 14 sensed on the light receiving surfaces of the first and second light sensing elements 1, 4 is the same.

Moreover, when the light source 13 deviates from the normal 12a and approaches the first straight line AB and the angle of incidence |−θ| of the incident light 14 increases, the path of incidence of the incident light 14 from the first light receiving lens 22 to the first light sensing element 1 approaches a straight line, the amount of light sensed by the first light sensing element 1 increases, and, conversely, the amount of light sensed by the second light sensing element 4 decreases. In addition, when the light source 13 is located on the first straight line AB, the path of incidence of the incident light 14 from the first light receiving lens 22 to the first light sensing element 1 becomes a straight line and the amount of light sensed by the first light sensing element 1 reaches its maximum, and, when the light source 13 further deviates from the first straight line AB away from the normal 12a and the angle of incidence |−θ| of the incident light 14 increases even more, the path of incidence of the incident light 14 from the first light receiving lens 22 to the first light sensing element 1 is bent and the amount of light sensed by the first light sensing element 1 starts decreasing.

In a similar manner, when the light source 13 deviates from the normal 12a and approaches the second straight line AC and the angle of incidence |+θ| of the incident light 14 increases, the amount of light sensed by the second light sensing element 4 increases, and, conversely, the amount of light sensed by the first light sensing element 1 decreases. In addition, when the light source 13 is located on the second straight line AC, the amount of light sensed by the second light sensing element 4 reaches its maximum and when the light source 13 deviates further from the second straight line AC away from the normal 12a and the angle of incidence |+θ| of the incident light 14 increases even more, the amount of light sensed by the second light sensing element 4 starts decreasing.

The light sensing outputs of the first and second light sensing elements 1, 4 change depending on the incidence angle ±θ of the incident light 14 as shown in the graph of FIG. 2A. In addition, when the difference and sum of the light sensing outputs of the first and second light sensing elements 1, 4 are obtained and the ratio r between the difference and the sum is determined, this ratio r changes as shown in the graph of FIG. 2B. Therefore, if the ratio r between the difference and the sum of the light sensing outputs of the first and second light sensing elements 1, 4 is obtained, then it will be possible to obtain the angle of incidence ±θ of the incident light 14, that is, the direction of the light source 13.

Because the major axes 22a, 25a of the first and second light receiving lenses 22, 25 in the light angle detection device 20 are aligned with the first and second straight lines AB, AC of the isosceles triangle, when the light source 13 is located on the first straight line AB or second straight line AC, the incident light 14 is linearly incident from the first and second light receiving lenses 22, 25 upon the first and second light sensing elements 1, 4, the degree of light concentration on the light receiving surfaces of the first and second light sensing elements 1, 4 increases, the peak values of the light sensing outputs of the first and second light sensing elements 1, 4 become larger, the S/N ratio becomes higher, and the accuracy of detection of the angle of incidence θ of the incident light 14 by the first and second light sensing elements 1, 4 becomes higher as well.

Moreover, in a manner similar to the light angle detection device 10 of Embodiment 1, there is no cost increase because only two, first and second light sensing elements 1, 4 are used. Furthermore, since the first and second light sensing elements 1, 4 are encapsulated in a single body of light transmitting resin 8, the light angle detection device 20 can be miniaturized, the manufacturing process is simplified, the amount of light transmitting resin 8 and light blocking resin 9 used is small and cost increases can be minimized. Moreover, since the first and second light sensing elements 1, 4 are encapsulated in the light transmitting resin 8 and a portion of the light transmitting resin 8 is used to mold the first and second light receiving lenses 22, 25, the first and second light sensing elements 1, 4 are easy to position and a high accuracy of positioning can be implemented. Furthermore, the accuracy of detection of the incidence angle θ of the incident light 14 by the first and second light sensing elements 1, 4 is high because the outer surface of the light transmitting resin 8, with the exception of the locations of the first and second light receiving lenses 22, 25, is covered by the light blocking resin 9.

Figure 5A:
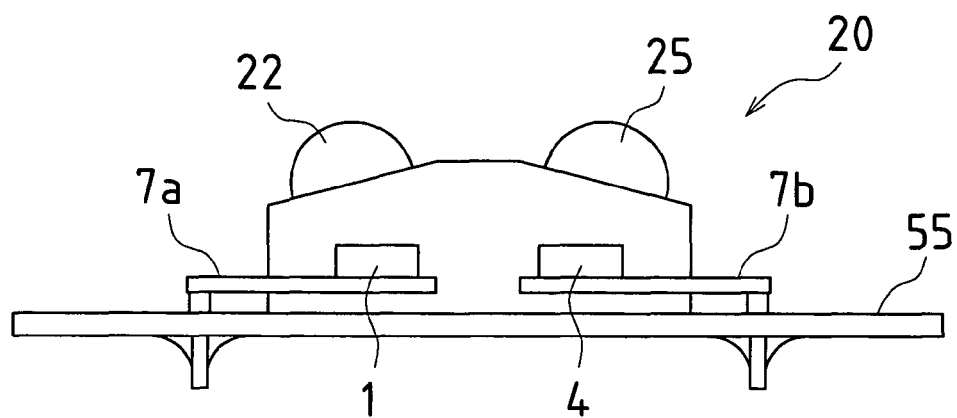
FIG. 5A is a cross sectional view schematically illustrating the configuration of a substrate carrying the light angle detection device shown in FIG. 4A.
Figure 5B:
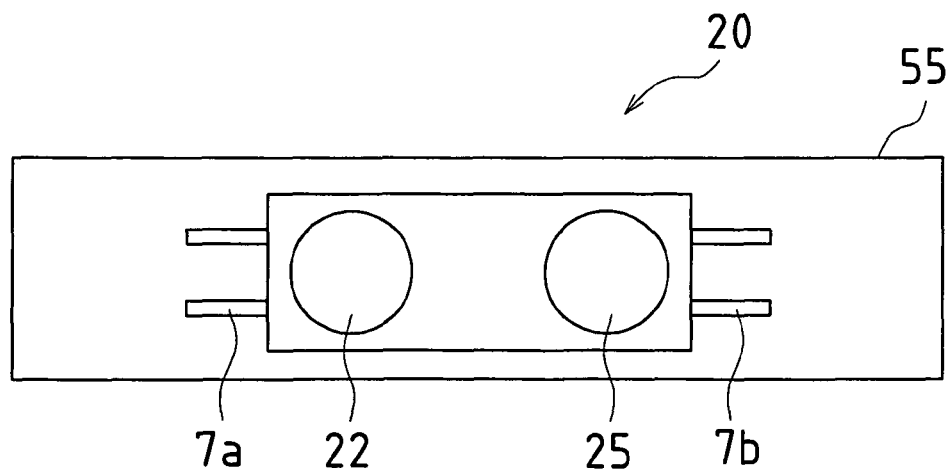
FIG. 5B is a plan view illustrating the substrate of FIG. 5A as seen from above.

FIG. 5A and FIG. 5B illustrate a substrate carrying a light angle detection device 20. Here, the ends of the lead frames 7a, 7b are bent and inserted into holes in a substrate 55, with the ends of the lead frames 7a, 7b soldered onto the rear surface of the substrate 55.

It should be noted that the light angle detection device of the present embodiment is manufactured in accordance with the same method as the above-described light angle detection device manufacturing method of Embodiment 1.

Embodiment 3

Figure 6A:
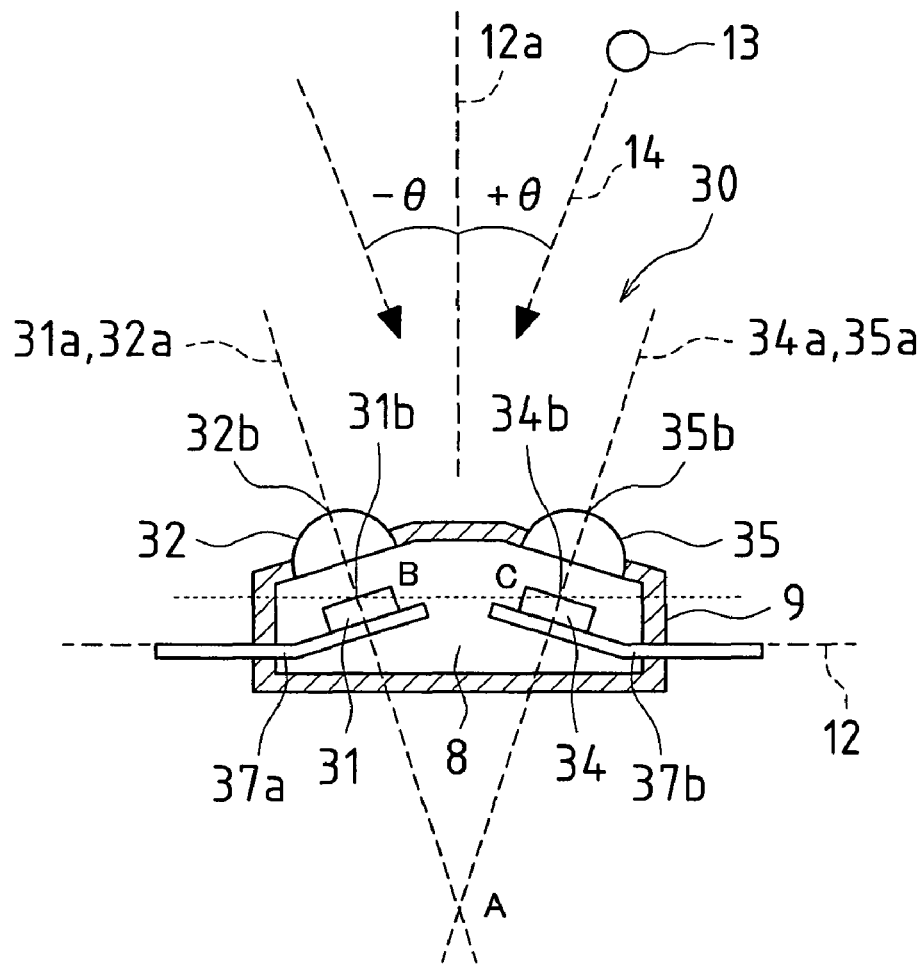
FIG. 6A is a cross sectional view schematically illustrating the configuration of a light angle detection device according to Embodiment 3 of the present invention.
Figure 6B:
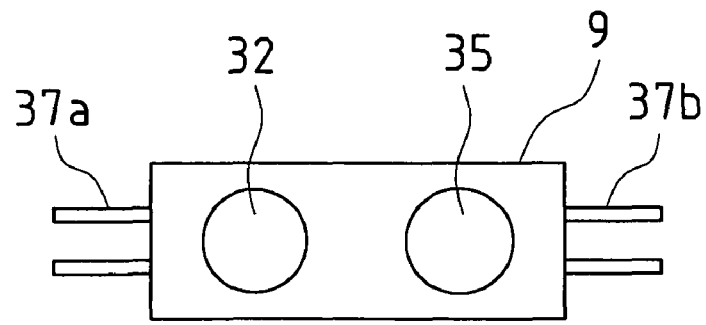
FIG. 6B is a plan view illustrating the light angle detection device of FIG. 6A as seen from above.

FIGS. 6A to 6B are diagrams illustrating a light angle detection device according to Embodiment 3 of the present invention. FIG. 6A is a cross sectional view schematically illustrating the configuration of the light angle detection device according to Embodiment 3 of the present invention and FIG. 6B is a plan view illustrating the light angle detection device of FIG. 6A as seen from above. It should be noted that, in FIGS. 6A to 6B, parts performing the same action as in the light angle detection device 10 illustrated in FIGS. 1A to 1C are assigned the same numerals.

In the light angle detection device 30 of the present embodiment, the orientation of the first and second light sensing elements 31, 34 differs from the orientation of the first and second light sensing elements 1, 4 of the light angle detection device 10 of Embodiment 1 and the orientation of the first and second light receiving lenses 32, 35 is different from the orientation of the first and second light receiving lenses 2, 5 of the light angle detection device 10 of Embodiment 1. Specifically, the orientation of the first and second light sensing elements 31, 34 is set such that a normal 31a passing through a center 31b of a light receiving surface of the first light sensing element 31 and a normal 34a passing through a center 34b of a light receiving surface of the second light sensing element 34 are aligned with the first and second straight lines AB, AC of the two equal sides of the isosceles triangle, with the lead frames 37a, 37b bent substantially along the center in order to set the orientation of the light sensing elements 31, 34. Moreover, the orientation of the first and second light receiving lenses 32, 35 is set such that major axes 32a, 35a of the first and second light receiving lenses 32, 35 are aligned with the first and second straight lines AB, AC of the two equal sides of the isosceles triangle. Just as the first and second light receiving lenses 2, 5 of the light angle detection device 10 of Embodiment 1, the first and second light receiving lenses 32, 35 are obtained by molding a portion of the light transmitting resin 8.

In this light angle detection device 30, the top surface of the terminal portions of the lead frames 37a, 37b is used as a reference plane 12, with the first and second light sensing elements 31, 34 and the first and second light receiving lenses 32, 35 disposed so as to permit detection of the angle of incidence ±θ of incident light 14 relative to the normal 12a to the reference plane 12 passing midway between the light sensing elements 31, 34 based on the light sensing outputs of the first and second light sensing elements 31, 34 when incident light 14 from an external light source 13 is received by the first and second light sensing elements 31, 34 through the first and second light receiving lenses 32, 35.

Namely, the first and second light sensing elements 31, 34 and the first and second light receiving lenses 32, 35 are disposed such that a first straight line AB passing through the center 31b of the light receiving surface of the first light sensing element 31 and the vertex 32b of the first light receiving lens 32, a second straight line AC passing through the center 34b of the light receiving surface of the second light sensing element 34 and the vertex 35b of the second light receiving lens 35, and a third straight line BC passing through the center 31b of the light receiving surface of the first light sensing element 31 and the center 34b of the light receiving surface of the second light sensing element 34 define an isosceles triangle, in which the third straight line BC serves as a base.

Specifically, the first and second light sensing elements 31, 34 and the first and second light receiving lenses 32, 35 are positioned such that the height of the centers of the light receiving surfaces of the first and second light sensing elements 31, 34 relative to the reference plane 12 is the same and the height of the vertices of the first and second light receiving lenses 32, 35 relative to the reference plane 12 is the same as well. In addition, as previously mentioned, a normal 31a passing through the center 31b of the light receiving surface of the first light sensing element 31 and a normal 34a passing through the center 34b of the light receiving surface of the second light sensing element 34 are aligned with the first and second straight lines AB, AC of the two equal sides of the isosceles triangle, and the major axes 32a, 35a of the first and second light receiving lenses 32, 35 are aligned with the first and second straight lines AB, AC of the two equal sides of the isosceles triangle.

In such an arrangement, when the light source 13 is located on the normal 12a to the reference plane 12 (which bisects the angle at the vertex A of the isosceles triangle) passing midway between the light sensing elements 31, 34, the angle of incidence ±θ of the incident light 14 is zero and the amount of the incident light 14 sensed on the light receiving surfaces of the first and second light sensing elements 31, 34 is the same.

Moreover, when the light source 13 deviates from the normal 12a and approaches the first straight line AB and the angle of incidence |−θ| of the incident light 14 increases, the amount of light sensed by the first light sensing element 31 increases, and, conversely, the amount of light sensed by the second light sensing element 34 decreases. In addition, when the light source 13 is located on the first straight line AB, the amount of light sensed by the first light sensing element 31 reaches its maximum and when the light source 13 deviates further from the first straight line AB away from the normal 12a and the angle of incidence |−θ| of the incident light 14 increases even more, the amount of light sensed by the first light sensing element 31 starts decreasing.

In a similar manner, when the light source 13 deviates from the normal 12a and approaches the second straight line AC and the angle of incidence |+θ| of the incident light 14 increases, the amount of light sensed by the second light sensing element 34 increases, and, conversely, the amount of light sensed by the first light sensing element 31 decreases. In addition, when the light source 13 is located on the second straight line AC, the amount of light sensed by the second light sensing element 34 reaches its maximum and when the light source 13 deviates further from the second straight line AC away from the normal 12a and the angle of incidence |+θ| of the incident light 14 increases even more, the amount of light sensed by the second light sensing element 34 starts decreasing.

The light sensing outputs of the first and second light sensing elements 31, 34 change depending on the incidence angle ±θ of the incident light 14 as shown in the graph of FIG. 2A. In addition, the ratio r between the difference and the sum of the light sensing outputs of the first and second light sensing elements 31, 34 changes as shown in the graph of FIG. 2B. Therefore, if the ratio r between the difference and the sum of the light sensing outputs of the first and second light sensing elements 31, 34 is obtained, then it will be possible to obtain the angle of incidence ±θ of the incident light 14, that is, the direction of the light source 13.

In the light angle detection device 30, the major axes 32a, 35a of the first and second light receiving lenses 32, 35 are aligned with the first and second straight lines AB, AC of the two equal sides of the isosceles triangle, as a result of which the degree of light concentration on the light receiving surfaces of the first and second light sensing elements 31, 34 can be raised when the light source 13 is located on the first straight line AB or second straight line AC. Moreover, since the normal 31a passing through the center 31b of the light receiving surface of the first light sensing element 31 and the normal 34a passing through the center 34b of the light receiving surface of the second light sensing element 34 are aligned with the first and second straight lines AB, AC, the focused light spots on the light receiving surfaces of the first and second light sensing elements 31, 34 become smaller. As a result, the peak values of the light sensing outputs of the first and second light sensing elements 31, 34 are increased, the S/N ratio becomes higher, and the accuracy of detection of the incidence angle θ of the incident light 14 by the first and second light sensing elements 31, 34 is raised.

Here, in the light angle detection device 10 of Embodiment 1 shown in FIGS. 1A to 1C, the normal to the center of the light receiving surface of the first light sensing element 1 and the major axis of the first light receiving lens 2 are not aligned with the first straight line AB and the normal to the center of the light receiving surface of the second light sensing element 4 and the major axis of the second light receiving lens 5 are not aligned with the second straight line AC, with the advantage that the accuracy of detection in the angular range between the first and second straight lines AB and AC is increased while the peak values of the light sensing outputs of the first and second light sensing elements 1, 4 are smaller in comparison with the light angle detection device 30 of the present embodiment and the light angle detection device 20 of Embodiment 2 illustrated in FIG. 4A and FIG. 4B. Therefore, one of the arrangements of Embodiment 1 to Embodiment 3 may be selected and adopted depending on the intended use of the light angle detection device.

Moreover, there is no cost increase because, in a manner similar to the light angle detection device 10 of Embodiment 1, only two, first and second light sensing elements 31, 34 are used in the light angle detection device 30 of the present embodiment. Furthermore, since the first and second light sensing elements 31, 34 are encapsulated in a single body of light transmitting resin 8, the light angle detection device 30 can be miniaturized, the manufacturing process is simplified, the amount of light transmitting resin 8 and light blocking resin 9 used is small and cost increases can be minimized. Moreover, since the first and second light sensing elements 31, 34 are encapsulated in the light transmitting resin 8 and a portion of the light transmitting resin 8 is used to mold the first and second light receiving lenses 32, 35, the first and second light sensing elements 31, 34 are easy to position and a high accuracy of positioning can be implemented. Furthermore, the accuracy of detection of the incidence angle θ of the incident light 14 by the first and second light sensing elements 31, 34 is high because the outer surface of the light transmitting resin 8, with the exception of the locations of the first and second light receiving lenses 32, 35, is covered by the light blocking resin 9.

Figure 7A:
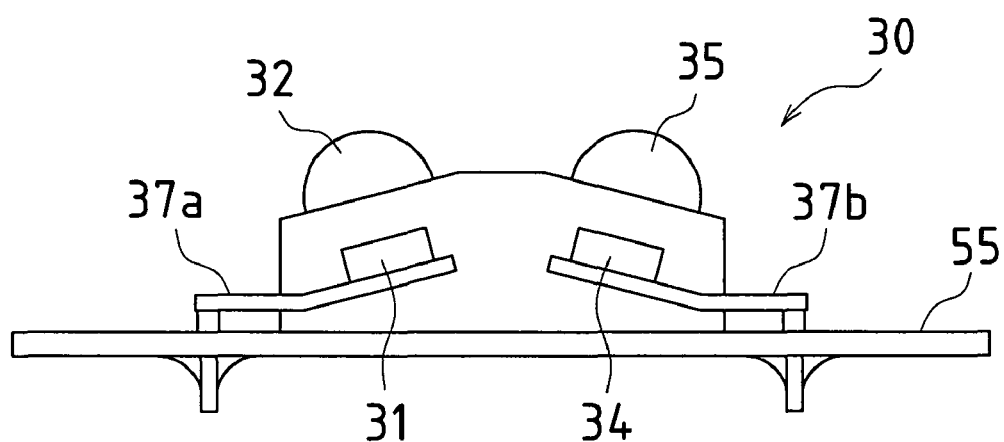
FIG. 7A is a cross sectional view schematically illustrating the configuration of a substrate carrying the light angle detection device shown in FIG. 6A.
Figure 7B:
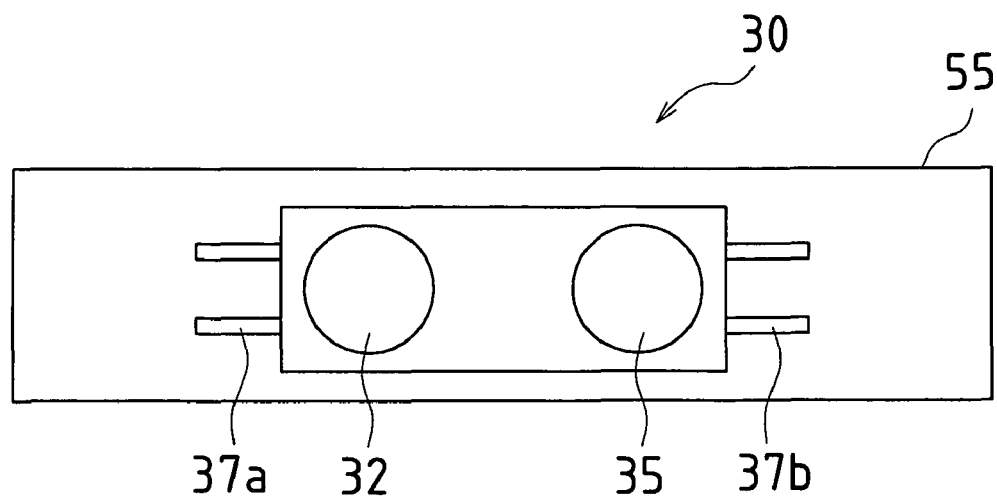
FIG. 7B is a plan view illustrating the substrate of FIG. 7A as seen from above.

FIG. 7A and FIG. 7B illustrate a substrate carrying a light angle detection device 30. Here, the ends of the lead frames 37a, 37b are bent and inserted into holes in a substrate 55, with the ends of the lead frames 37a, 37b soldered onto the rear surface of the substrate 55.

Figure 8A:
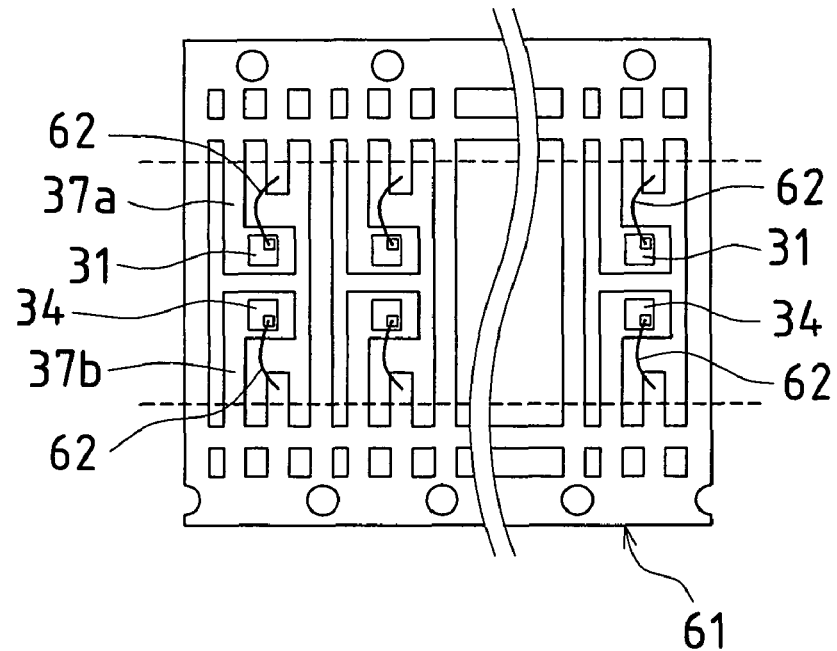
FIG. 8A is a diagram used to explain an embodiment of the light angle detection device fabrication method used in Embodiment 3 of the present invention.
Figure 8B:
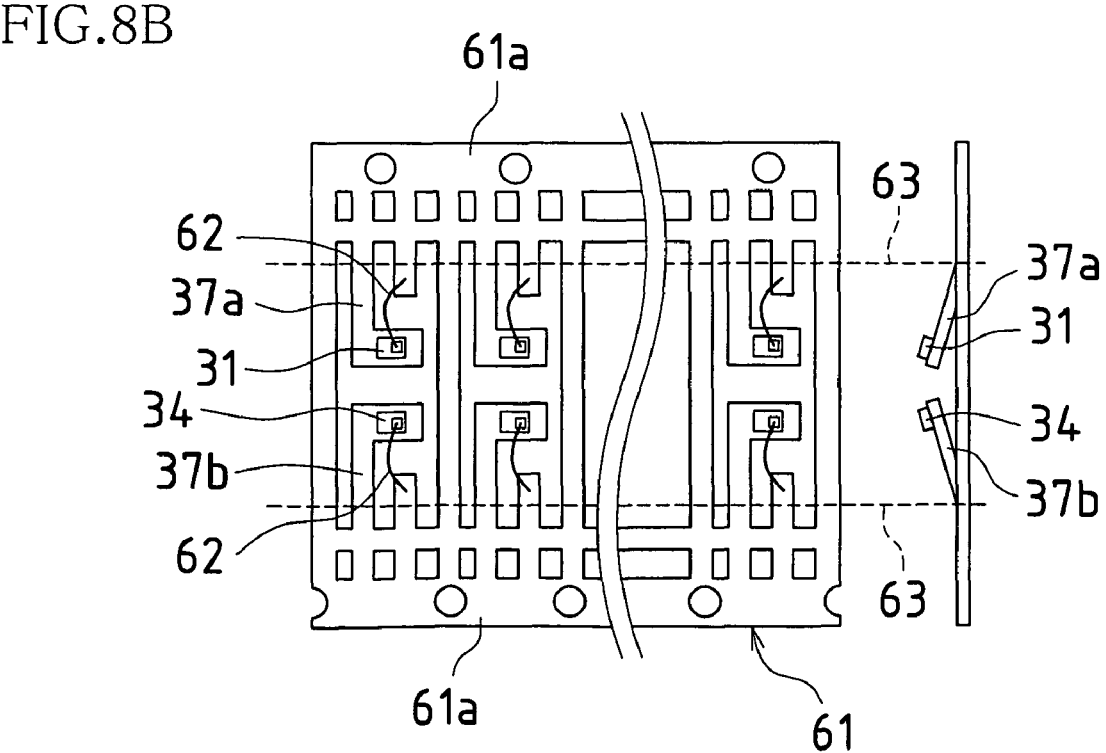
FIG. 8B is a diagram used to explain an embodiment of the light angle detection device fabrication method used in Embodiment 3 of the present invention.

The method of fabrication of the light angle detection device of the present embodiment is explained next. FIGS. 8A to 8C are explanatory diagrams used to explain the light angle detection device fabrication method of the present embodiment.

In the fabrication method of the present embodiment, in the same manner as in the light angle detection device fabrication method of Embodiment 1 described above, a lead frame 61, such as the one shown in FIG. 3A, is used to simultaneously fabricate multiple light angle detection devices 30. It should be noted that, prior to the processing of the lead frame 61, the lead frames 37a, 37b are flat plate-shaped in the same manner as the lead frames 7a, 7b.

As shown in FIG. 8A, in each single pair of lead frames 37a, 37b, first and second light sensing elements 31, 34 are die-bonded to the die-bonding portions of the lead frames 37a, 37b, with the first and second light sensing elements 31, 34 connected to the lead frames 37a, 37b by the respective bonding wires 62.

In addition, as shown in FIG. 8A and FIG. 8B, in each single pair of lead frames 37a, 37b, the lead frames 37a, 37b are bent to a predefined angle along the dotted lines 63 in the vicinity of their proximal ends. As a result, the orientation of the first and second light sensing elements 31, 34 is set as shown in FIG. 6B.

At such time, not only are the lead frames 37a, 37b bent, but other portions of the lead frame 61, through which the dotted lines 63 pass, are bent as well, thereby preventing breakage of the bonding wires 62.

Subsequently, the lead frame 61 is put into a mold (not shown), the first and second light sensing elements 31, 34 in each single pair of the lead frames 37a, 37b are positioned in the molding space of the mold, and heat-liquefied light transmitting resin is poured into the molding space of the mold to form light transmitting resin 8 encapsulating the first and second light sensing elements 31, 34 (transfer molding). At such time, a portion of the light transmitting resin 8 is molded in the mold to produce the first and second light receiving lenses 32, 35.

Furthermore, after the light transmitting resin 8 solidifies, the tie bars 61a of the lead frame 61 are cut off and the lead frame 61 is separated into light transmitting resin units 8.

Finally, the outer surface of the light transmitting resin units 8, with the exception of the locations of the first and second light receiving lenses, is covered with light blocking resin 9 to yield light angle detection devices 30.

In the fabrication method of the present embodiment, in the same manner as in the light angle detection device fabrication method of Embodiment 1 described above, most steps involve handling the flat plate-shaped lead frame 61, which permits easy implementation of automatic processing, allows for a large number of devices to be manufactured within a short time period, and makes it possible to provide light angle detection devices in a less expensive manner.

Embodiment 4

Figure 9A:
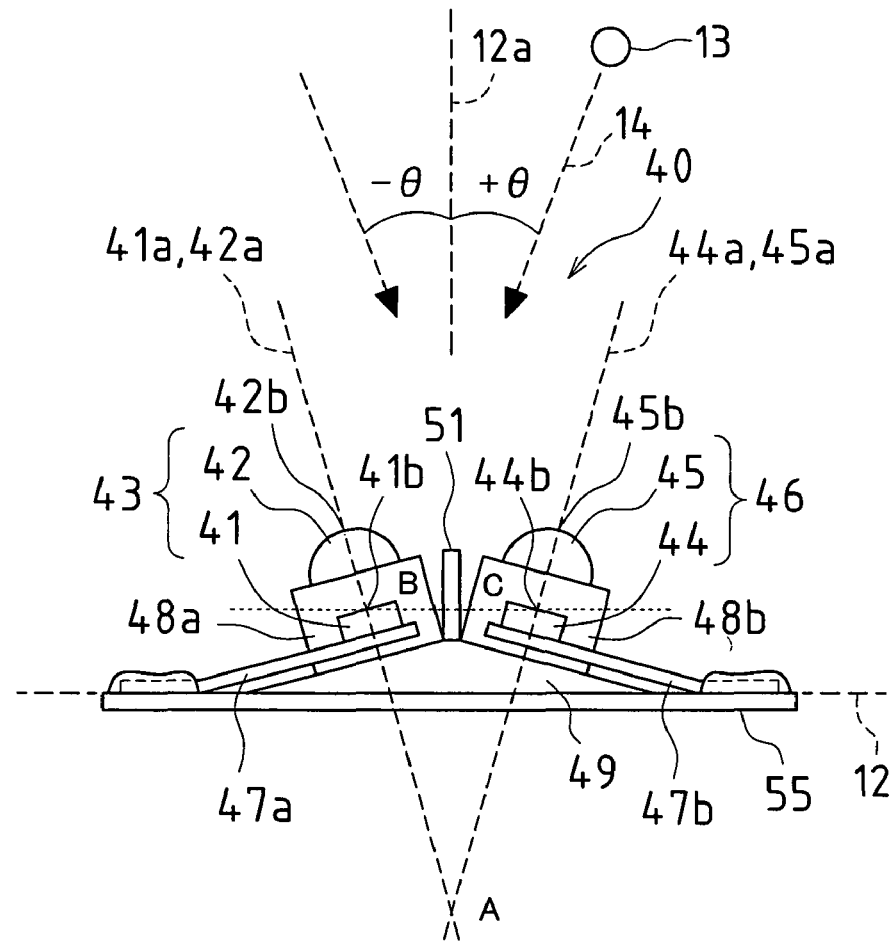
FIG. 9A is a cross sectional view schematically illustrating the configuration of a light angle detection device according to Embodiment 4 of the present invention.
Figure 9B:
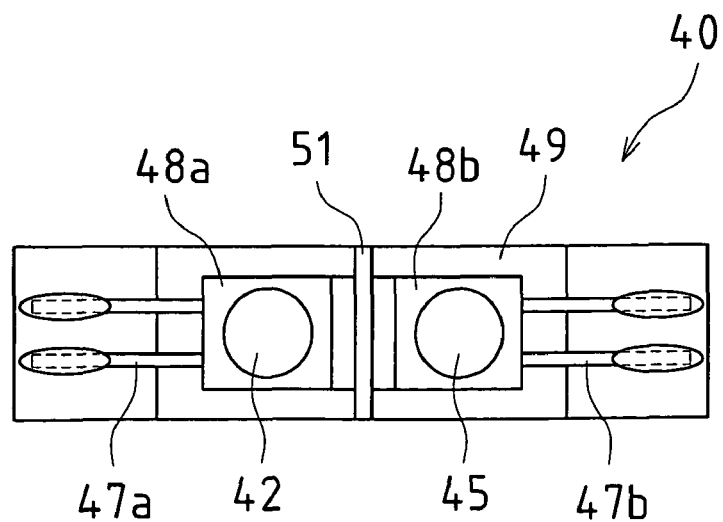
FIG. 9B is a plan view illustrating the light angle detection device of FIG. 9A as seen from above.

FIGS. 9A to 9B are diagrams illustrating a light angle detection device according to Embodiment 4 of the present invention. FIG. 9A is a cross sectional view schematically illustrating the configuration of the light angle detection device according to Embodiment 4 of the present invention and FIG. 9B is a plan view illustrating the light angle detection device of Embodiment 4 as seen from above.

In the light angle detection device 40 of the present embodiment, a first light receiving unit 43, which comprises a first light sensing element 41 and a first light receiving lens 42, and a second light receiving unit 46, which comprises a second light sensing element 44 and a second light receiving lens 45, are separately placed on the respective lead frames 47a, 47b, and these lead frames 47a, 47b are disposed on, and joined to, a substrate 55.

The first light sensing element 41 is placed on the die-bonding portion of the lead frame 47a, the die-bonding portion of the lead frame 47a and the first light sensing element 41 are encapsulated in light transmitting resin 48a, and a portion of the light transmitting resin 48a is molded to produce the first light receiving lens 42. A normal 41a passing through a center 41b of a light receiving surface of the first light sensing element 41 and a major axis 42a of the first light receiving lens 42 are mutually aligned. In a similar manner, the second light sensing element 44 is placed on the die-bonding portion of the lead frame 47b, the die-bonding portion of the lead frame 47b and the second light sensing element 44 are encapsulated in light transmitting resin 48b, and a portion of the light transmitting resin 48a is molded to produce the second light receiving lens 45. A normal 44a passing through a center 44b of a light receiving surface of the second light sensing element 44 and a major axis 45a of the second light receiving lens 45 are mutually aligned.

The first and second light sensing elements 41, 44 are identical and possess correspondingly identical characteristics. The first and second light receiving lenses 42, 45 are identical and possess correspondingly identical characteristics.

The lead frame 47a is bent in the vicinity of its left end, the left end of the lead frame 47a is soldered to the substrate 55, the light transmitting resin 48a is placed on one of the inclined surfaces of a spacer 49 that has two inclined surfaces at the same angle with respect to the substrate 55 on the substrate 55 and the die-bonding portion of the lead frame 47a is inclined with respect to the top surface of the substrate 55. Moreover, the lead frame 47b is bent in the vicinity of its right end, the right end of the lead frame 47b is soldered to the substrate 55, the light transmitting resin 48b is placed on the other inclined surfaces of the spacer 49 on the substrate 55 and the die-bonding portion of the lead frame 47b is inclined with respect to the top surface of the substrate 55. By doing so, the normal 41a passing through the center 41b of the light receiving surface of the first light sensing element 41 and the major axis 42a of the first light receiving lens 42 are aligned with a first straight line, AB, which constitutes one of the sides of the isosceles triangle. In addition, the normal 44a passing through the center 44b of the light receiving surface of the second light sensing element 44 and the major axis 45a of the second light receiving lens 45 are aligned with a second straight line, AC, which constitutes another side of the isosceles triangle. Moreover, a light blocking member (light blocking unit) 51 is interposed between the first and second light receiving lenses 42, 45.

In this light angle detection device 40, the top surface of the substrate 55 is used as a reference plane 12, with the first and second light sensing elements 41, 44 and the first and second light receiving lenses 42, 45 disposed so as to permit detection of the angle of incidence $\pm\theta$ of incident light 14 relative to the normal 12a to the reference plane 12 passing midway between the light sensing elements 41, 44 based on the light sensing outputs of the first and second light sensing elements 41, 44 when incident light 14 from an external light source 13 is received by the first and second light sensing elements 41, 44 through the first and second light receiving lenses 42, 45.

Namely, the first and second light sensing elements 41, 44 and the first and second light receiving lenses 42, 45 are disposed such that the first straight line AB passing through the center 41b of the light receiving surface of the first light sensing element 41 and the vertex 42b of the first light receiving lens 42, the second straight line AC passing through the center 44b of the light receiving surface of the second light sensing element 44 and the vertex 45b of the second light receiving lens 45, and a third straight line BC passing through the center 41b of the light receiving surface of the first light sensing element 41 and the center 44b of the light receiving surface of the second light sensing element 44 define an isosceles triangle, in which the third straight line BC serves as a base.

Specifically, the first and second light sensing elements 41, 44 and the first and second light receiving lenses 42, 45 are positioned such that the height of the centers of the light receiving surfaces of the first and second light sensing elements 41, 44 relative to the reference plane 12 is the same and the height of the vertices of the first and second light receiving lenses 42, 45 relative to the reference plane 12 is the same as well. In addition, as previously mentioned, a normal 41a passing through the center 41b of the light receiving surface of the first light sensing element 41 and a normal 44a passing through the center 44b of the light receiving surface of the second light sensing element 44 are aligned with the first and second straight lines AB, AC of the two equal sides of the isosceles triangle, and the major axes 42a, 45a of the first and second light receiving lenses 42, 45 are aligned with the first and second straight lines AB, AC of the two equal sides of the isosceles triangle.

In such an arrangement, when the light source 13 is located on the normal 12a to the reference plane 12 (which bisects the angle at the vertex A of the isosceles triangle), the angle of incidence $\pm\theta$ of the incident light 14 is zero and the amount of the incident light 14 sensed on the light receiving surfaces of the first and second light sensing elements 41, 44 is the same.

Moreover, when the light source 13 deviates from the normal 12a and approaches the first straight line AB and the angle of incidence $|-\theta|$ of the incident light 14 increases, the amount of light sensed by the first light sensing element 41 increases. When the light source 13 is located on the first straight line AB, the amount of light sensed by the first light sensing element 41 reaches its maximum and when the light source 13 crosses the first straight line AB and the angle of incidence |−θ| of the incident light 14 increases even more, the amount of light sensed by the first light sensing element 41 starts decreasing.

In a similar manner, when the light source 13 deviates from the normal 12a and approaches the second straight line AC and the angle of incidence |+θ| of the incident light 14 increases, the amount of light sensed by the second light sensing element 44 increases. When the light source 13 is located on the second straight line AC, the amount of light sensed by the second light sensing element 44 reaches its maximum and when the light source 13 crosses the second straight line AC and the angle of incidence |+θ| of the incident light 14 increases even more, the amount of light sensed by the second light sensing element 44 starts decreasing.

The light sensing outputs of the first and second light sensing elements 41, 44 change depending on the incidence angle ±θ of the incident light 14 as shown in the graph of FIG. 2A. In addition, the ratio r between the difference and the sum of the light sensing outputs of the first and second light sensing elements 41, 44 changes as shown in the graph of FIG. 2B. Therefore, if the ratio r between the difference and the sum of the light sensing outputs of the first and second light sensing elements 41, 44 is obtained, then it will be possible to obtain the angle of incidence ±θ of the incident light 14, that is, the direction of the light source 13.

In the light angle detection device 40, in the same manner as in the light angle detection device 30 of Embodiment 3 illustrated in FIG. 6A and FIG. 6B, when the light source 13 is located on the first straight line AB or second straight line AC, the degree of light concentration on the light receiving surfaces of the first and second light sensing elements 41, 44 increases and the focused light spots on the light receiving surfaces of the first and second light sensing elements 41, 44 become smaller, as a result of which the peak values of the light sensing outputs of the first and second light sensing elements 41, 44 become larger, the S/N ratio becomes higher, and the accuracy of detection of the angle of incidence θ of the incident light 14 by the first and second light sensing elements 41, 44 becomes higher as well.

Moreover, there is no cost increase because, in a manner similar to the light angle detection device 10 of Embodiment 1 illustrated in FIGS. 1A to 1C, only two, first and second light sensing elements 41, 44 are used in the light angle detection device 40 of the present embodiment.

Furthermore, if we consider the construction of the first and second light receiving units 43, 46, we shall see that, in this construction, a light sensing element is mounted to a lead frame and a light receiving lens is provided. Since this is identical to the construction of a general-purpose light receiving device, the light angle detection device 40 can be formed simply by bending the lead frames of general-purpose light receiving devices and combining two light receiving devices on a substrate 55, which makes it possible to inexpensively provide the light angle detection device 40 using general-purpose light receiving devices.

Moreover, as a result of interposing a light blocking member 51 between the first and second light receiving lenses 42, 45, incident light passing through the first light receiving lens 42 is prevented from being incident upon the second light sensing element 44 and producing noise components while incident light passing through the second light receiving lens 45 is prevented from being incident upon the first light sensing element 41 and producing noise components. Therefore, only effective incident light passing through the first light receiving lens 42 is incident upon the first light sensing element 41 and only effective incident light passing through the second light receiving lens 45 is incident upon the second light sensing element 44, which raises the accuracy of detection of the incident angle θ of the incident light 14 by the first and second light sensing elements 41, 44.

Figure 10A:
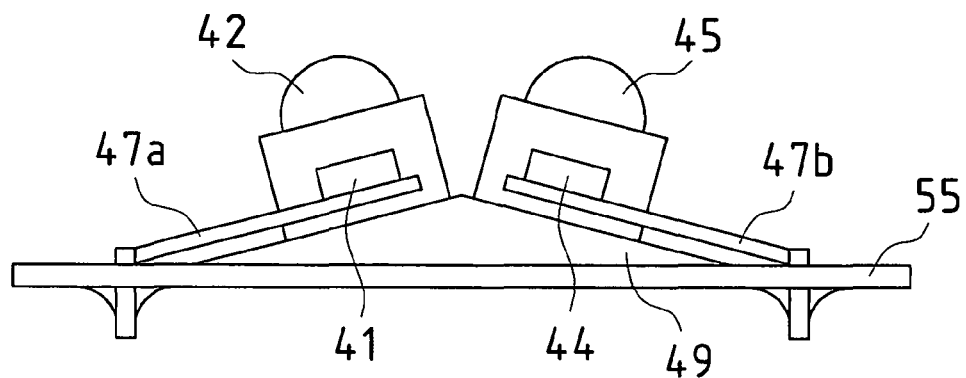
FIG. 10A is a cross-sectional view used to explain a variation of the light angle detection device shown in FIG. 9A.
Figure 10B:
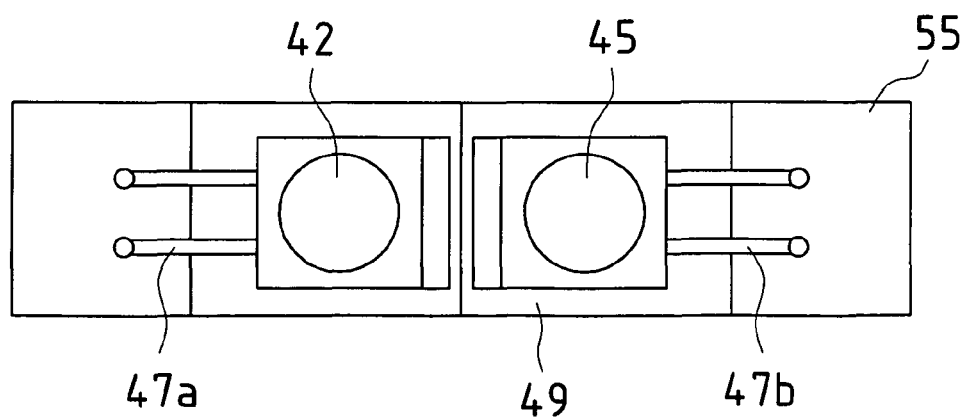
FIG. 10B is a plan view used to explain a variation of the light angle detection device shown in FIG. 9A.

FIG. 10A and FIG. 10B illustrate a variation of the light angle detection device 40 shown in FIG. 9A and FIG. 9B. Here, the ends of the lead frames 47a, 47b are bent and inserted into holes in a substrate 55, with the ends of the lead frames 47a, 47b soldered onto the rear surface of the substrate 55.

Figure 11A:
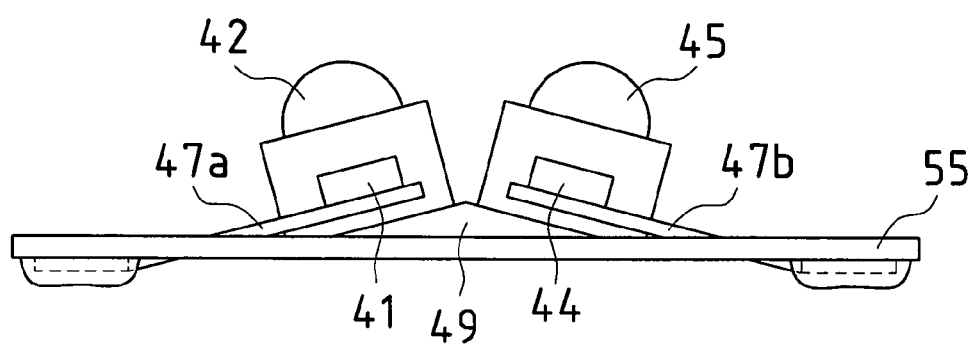
FIG. 11A is a cross-sectional view used to explain another variation of the light angle detection device shown in FIG. 9A.
Figure 11B:
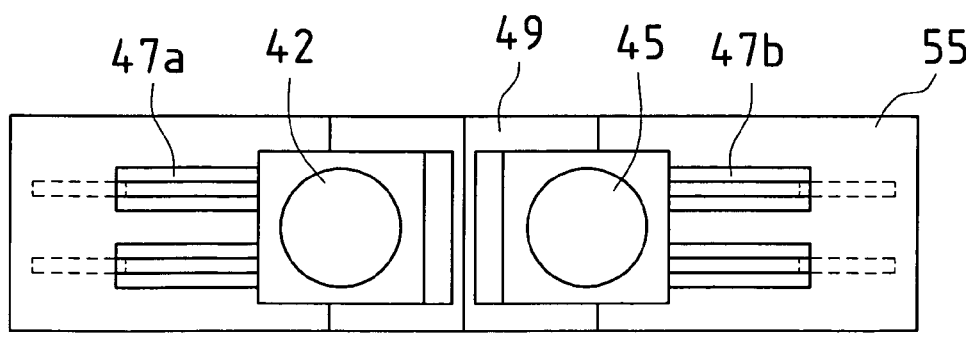
FIG. 11B is a plan view used to explain another variation of the light angle detection device shown in FIG. 9A.

Moreover, as shown in FIG. 11A and FIG. 11B, the ends of the lead frames 47a, 47b may be inserted through holes in the substrate 55 all the way to the rear surface without bending, with the ends of the lead frames 47a, 47b soldered onto the rear surface of the substrate 55.

Figure 12:
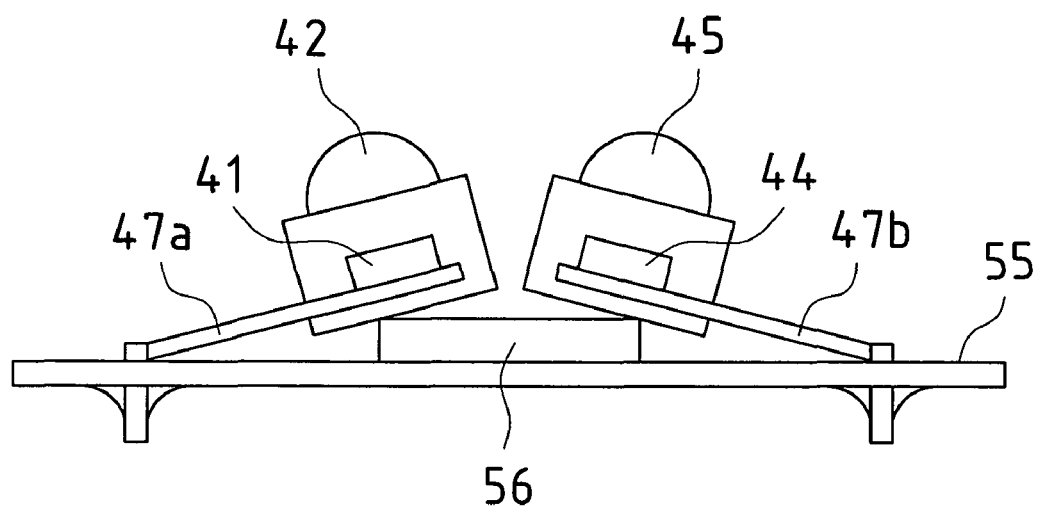
FIG. 12 is a cross-sectional view used to explain yet another variation of the light angle detection device shown in FIG. 9A.

Furthermore, instead of the spacer 49 of FIG. 9A, a flat plate-shaped spacer 56, such as the one illustrated in FIG. 12, may be used to place the lead frames 47a, 47b onto the edges of the spacer 56 so as to orient the lead frames 47a, 47b at a slant.

The method of fabrication of the light angle detection device of the present embodiment is explained next. FIGS. 13A to 13D are explanatory diagrams used to explain the light angle detection device fabrication method of the present embodiment.

Figure 13A:
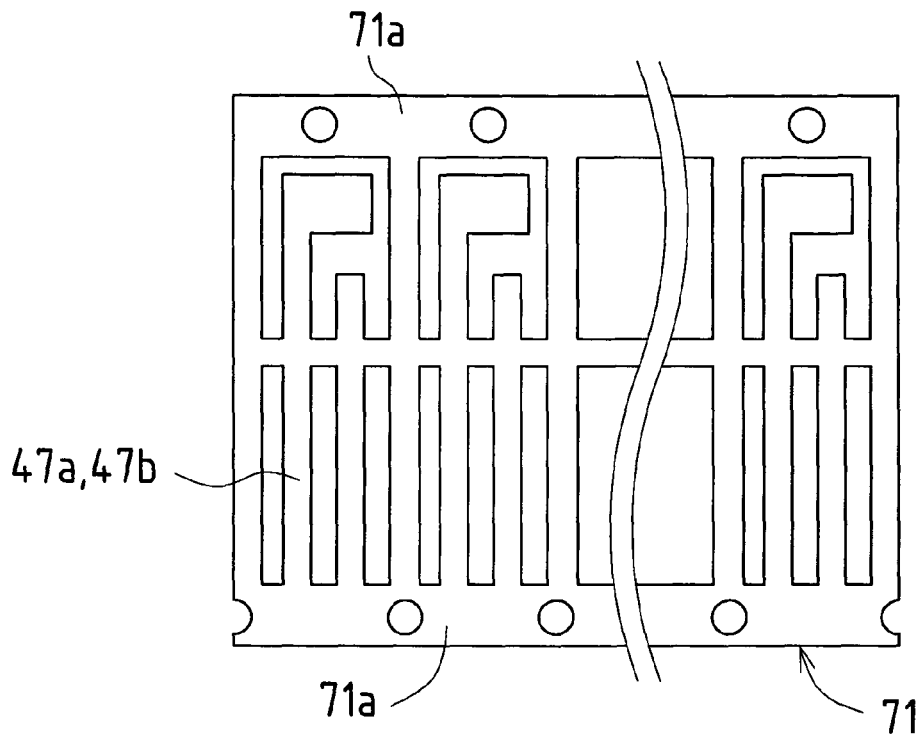
FIG. 13A is a diagram used to explain the light angle detection device fabrication method used in Embodiment 4 of the present invention.

In the fabrication method of the present embodiment, a lead frame 71, which contains multiple lead frames 47a, 47b shown in FIG. 13A, is used to simultaneously fabricate multiple light angle detection devices 40. In the lead frame 71, multiple lead frames 47a, 47b are arranged in the lateral direction, with the ends of each lead frame 47a, 47b connectedly supported by tie bars 71a.

Figure 13B:
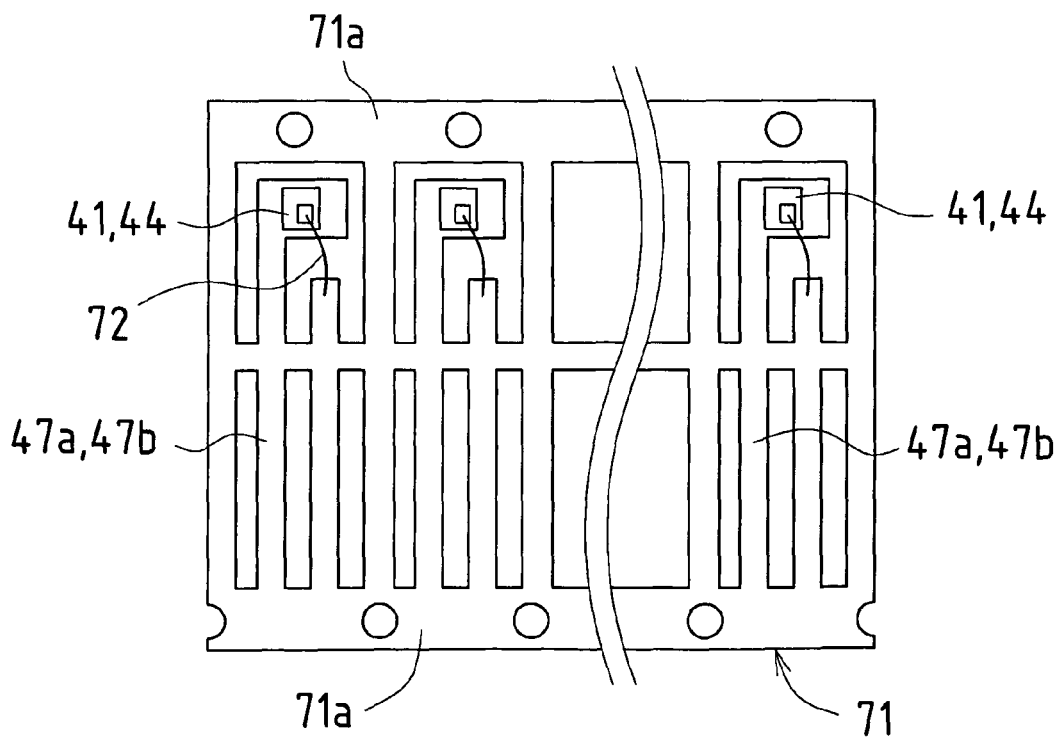
FIG. 13B is a diagram used to explain the light angle detection device fabrication method used in Embodiment 4 of the present invention.
Figure 13C:
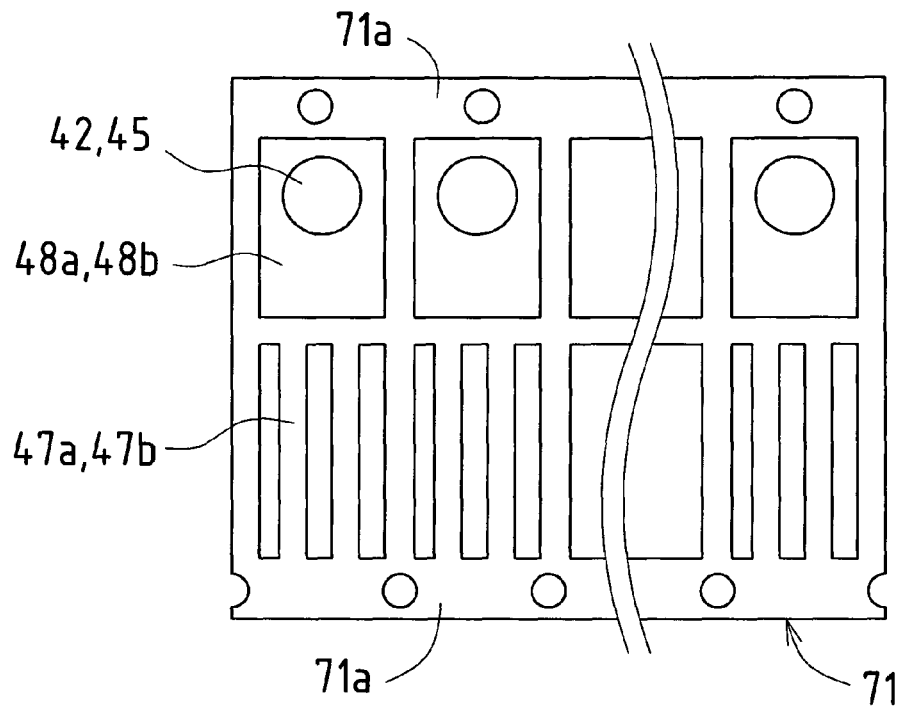
FIG. 13C is a diagram used to explain the light angle detection device fabrication method used in Embodiment 4 of the present invention.

As shown in FIG. 13B, in each lead frame 47a, 47b, a first light sensing element 41 or a second light sensing element 44 is die-bonded to the die-bonding portion of the lead frame, with the first and second light sensing elements 41, 44 connected to the lead frames by the respective bonding wires 72.

Subsequently, the lead frame 71 is positioned in a mold (not shown). At such time, the first or second light sensing element 41, 44 carried by the die-bonding portion of the lead frame 47a, 47b in each lead frame 47a, 47b is positioned inside the mold space of the mold. Heat-liquefied light transmitting resin is then poured into the mold space of the mold to form light transmitting resin 48a or 48b, which encapsulates the first or second light sensing element 41, 44 shown in FIG. 13C (transfer molding). At such time, a portion of the light transmitting resin 48a, 48b is molded in the mold to produce a first or second light receiving lens 42, 45.

Figure 13D:
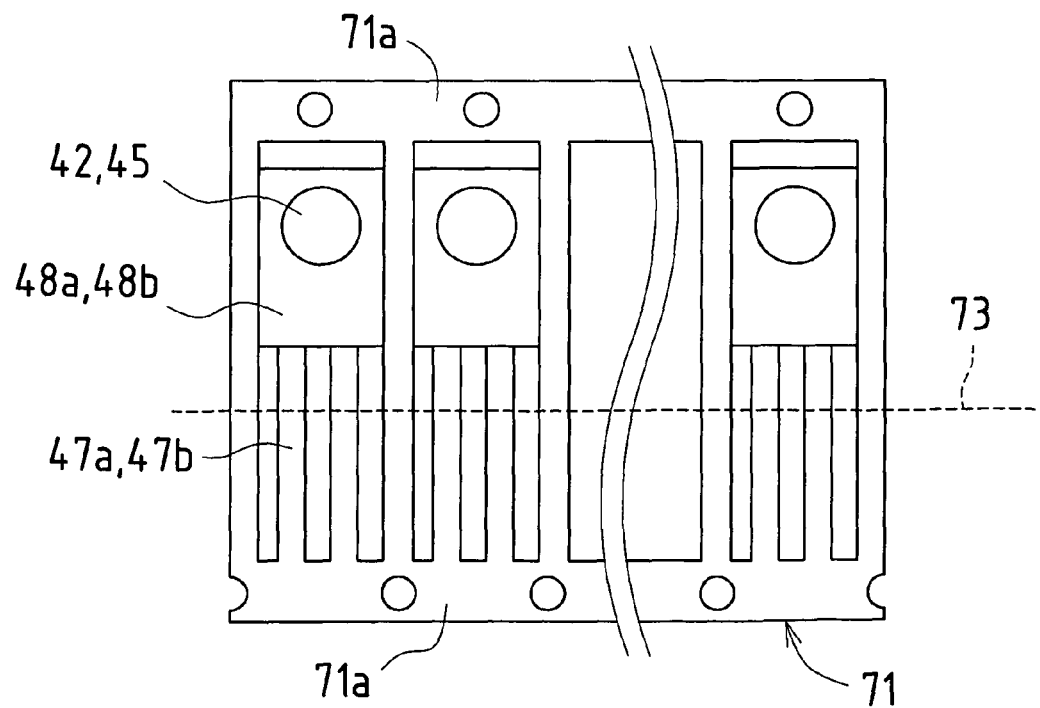
FIG. 13D is a diagram used to explain the light angle detection device fabrication method used in Embodiment 4 of the present invention.

Then, as shown in FIG. 13D, the lead frames 47a, 47b are bent to a predefined degree along the dotted line 73 at their proximal ends.

Furthermore, after the light transmitting resin 48a, 48b solidifies, the tie bars 71a of the lead frame 71 are cut off and the lead frame 71 is separated into light sensing element units.

Then, as shown in FIG. 9A, the left end of the lead frame 47a is soldered to the substrate 55 and the light transmitting resin 48a is placed onto one of the inclined surfaces of the spacer 49. In addition, the right end of the lead frame 47b is soldered to the substrate 55 and the light transmitting resin 48b is placed onto the other inclined surface of the spacer 49. Furthermore, a light blocking member 51 is disposed and secured between the first and second light receiving lenses 42, 45, yielding a light angle detection device 40.

In the fabrication method of the present invention, all the lead frames 47a, 47b are bent to a predefined degree along the dotted line 73 at their proximal ends, as a result of which the bending step can be performed in an efficient manner. Moreover, since the construction before the bending step, which comprises a lead frame, a light sensing element, and a light receiving lens, is the same as the construction of a general-purpose light receiving device, a component for the light angle detection device 40 can be fabricated simply by adding the step of bending the lead frame of a general-purpose light receiving device, which does not require additional special equipment and makes it possible to inexpensively provide the light angle detection device 40.

It should be noted that the present invention is not limited to the above-described embodiments and various modifications can be effected therein. For instance, the shape of the lenses, the type of the light sensing elements, their orientation and position can be suitably modified. Moreover, the shape and type of the light transmitting resin may be suitably modified. Furthermore, the present invention includes not only the light angle detection device and its fabrication method, but also an electronic device utilizing the light angle detection device. The electronic devices include devices receiving light signals emitted from the light sources of remote control transmitters, etc., various household electric appliances, and the like. More specifically, the light angle detection device of the present invention is installed in air conditioning systems such as fans, air conditioners, and heaters and is used to detect, on the air conditioning system side, the direction of a remote control transmitter operator and create an optimum air-conditioned space for the operator in the detected direction. Moreover, the light angle detection device of the present invention may be installed in audio equipment such as speaker systems etc. in order to detect the direction of the listeners and use the detected direction to produce an optimum sound field for the listeners. Alternatively, if the light angle detection device of the present invention is installed in a camera, it will be possible to detect the direction of a remote control transmitter operator, orient the camera in the detected direction, adjust the exposure and focus, etc. in this direction, and capture an image of the operator. In addition, significant effects can be obtained if the light angle detection device of the present invention is installed in an electronic device and the operational state of the electronic device is controlled depending on the direction of the operator of the remote control transmitter.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. A light angle detection device, comprising:
a first light receiving unit that has a first light receiving lens collecting incident light and a first light sensing element receiving the incident light collected by the first light receiving lens; and
a second light receiving unit that has a second light receiving lens collecting incident light and a second light sensing element receiving the incident light collected by the second light receiving lens, the second light receiving unit being arranged side-by-side with the first light receiving unit, wherein,
the first and second light sensing elements are encapsulated in a single body of light transmitting resin,
the first and second light receiving lenses are molded from a portion of the light transmitting resin,
the first light receiving lens, the first light sensing element, the second light receiving lens, and the second light sensing element are disposed such that a first straight line passing through a center of a light receiving surface of the first light sensing element and a vertex of the first light receiving lens, a second straight line passing through a center of a light receiving surface of the second light sensing element and a vertex of the second light receiving lens, and a third straight line passing through the center of the light receiving surface of the first light sensing element and the center of the light receiving surface of the second light sensing element form an isosceles triangle, in which the third straight line serves as a base, and
the light sensing outputs of the first and second light sensing elements change depending on the incidence angle of the incident light relative to the third straight line.

2. The light angle detection device according to claim 1, further comprising:
a light blocking unit provided between the first and second light receiving lenses, the light blocking unit preventing light that does not pass through the first light receiving lens from being incident upon the first light sensing element and light that does not pass through the second light receiving lens from being incident upon the second light sensing element.

3. The light angle detection device according to claim 1, wherein a normal to the light receiving surface of the first light sensing element, a major axis of the first light receiving lens, a normal to the light receiving surface of the second light sensing element, and a major axis of the second light receiving lens are parallel to each other and perpendicular to the third straight line.

4. The light angle detection device according to claim 1, wherein a normal to the light receiving surface of the first light sensing element and a normal to the light receiving surface of the second light sensing element are parallel to each other and perpendicular to the third straight line, a major axis of the first light receiving lens and a major axis of the second light receiving lens are aligned, respectively, with the first and second straight lines, and a straight line connecting the respective vertices of the first and second light receiving lenses is parallel to the third straight line.

5. The light angle detection device according to claim 1, wherein a normal passing through the center of the light receiving surface of the first light sensing element and a major axis of the first light receiving lens are both aligned with the first straight line, and a normal passing through the center of the light receiving surface of the second light sensing element and a major axis of the second light receiving lens are both aligned with the second straight line.

6. The light angle detection device according to claim 5, wherein the first light sensing element and the first light receiving lens, as well as the second light sensing element and the second light receiving lens, are placed on respective lead frames, and the lead frames are disposed such that the respective normals to these lead frames are aligned with the first and second straight lines.

7. A light angle detection device, comprising:
a first light receiving unit that has a first light receiving lens collecting incident light and a first light sensing element receiving the incident light collected by the first light receiving lens;
a second light receiving unit that has a second light receiving lens collecting incident light and a second light sensing element receiving the incident light collected by the second light receiving lens, the second light receiving unit being arranged side-by-side with the first light receiving unit;

a first lead frame, the first light sensing element and the first light receiving lens being placed thereon;

a second lead frame, the second light sensing element and the second light receiving lens being placed thereon; and a substrate, the first and second lead frames being disposed thereon, wherein a normal passing through a center of a light receiving surface of the first light sensing element and a major axis of the first light receiving lens are both aligned with a first straight line passing through the center of the light receiving surface of the first light sensing element and a vertex of the first light receiving lens, a normal passing through a center of a light receiving surface of the second light sensing element and a major axis of the second light receiving lens are both aligned with a second straight light line passing through the center of the light receiving surface of the second light sensing element and a vertex of the second light receiving lens, the first light receiving lens, the first light sensing element, the second light receiving lens, and the second light sensing element are disposed such that the first straight line, the second straight line, and a third straight line passing through the center of the light receiving surface of the first light sensing element form an isosceles triangle having the third straight line as its base by disposing the first and second lead frames on the substrate parallel to the third straight line with a spacer sandwiched between the lead frames and the substrate so as to set the incline of the first and second lead frames with respect to the substrate, and the light sensing outputs of the first and second light sensing elements change depending on the incidence angle of the incident light relative to the third straight line.

8. An electronic device utilizing the light angle detection device according to any one of the claims 1 or 2-7 above.

9. The light angle detention device according to claim 7, wherein the first light receiving lens is molded from a portion of the first light transmitting resin that encapsulates the first light sensing element and a placing portion of the first lead frame for placing the first light sensing element on the first lead frame, the second light receiving lens is molded from a portion of the second light transmitting resin that encapsulates the second light sensing element and a placing portion of the second lead frame for placing the second light sensing element on the second lead frame, the spacer has two inclined surfaces at the same angle with respect to the substrate, opposite ends of the placing portions of the first and second lead frames are disposed on the substrate, and the first light transmitting resin is placed on one inclined surface of the spacer on the substrate and the second light transmitting resin is placed on the other inclined surface of the spacer on the substrate.

10. The light angle detention device according to claim 7, wherein the first light receiving lens is molded from a portion of the first light transmitting resin that encapsulates the first light sensing element and a placing portion of the first lead frame for placing the first light sensing element on the first lead frame, the second light receiving lens is molded from a portion of the second light transmitting resin that encapsulates the second light sensing element and a placing portion of the second lead frame for placing the second light sensing element on the second lead frame, the spacer has a flat plate shape with two opposite edges, opposite ends of the placing portions of the first and second lead frames are disposed on the substrate, and the first light transmitting resin is placed on one edge of the spacer on the substrate and the second light transmitting resin is placed on the other edge of the spacer on the substrate.

11. A fabrication method for a light angle detection device, which is adapted to be provided with a first light receiving unit having a first light receiving lens collecting incident light and a first light sensing element receiving the incident light collected by the first light receiving lens and a second light receiving unit having a second light receiving lens collecting incident light and a second light sensing element receiving the incident light collected by the second light receiving lens, and in which the first light receiving lens, the first light sensing element, the second light receiving lens, and the second light sensing element are disposed such that a first straight line passing through a center of a light receiving surface of the first light sensing element and a vertex of the first light receiving lens, a second straight line passing through a center of a light receiving surface of the second light sensing element and a vertex of the second light receiving lens, and a third straight line passing through the center of the light receiving surface of the first light sensing element and the center of the light receiving surface of the second light sensing element form an isosceles triangle having the third straight line as its base, and the light sensing outputs of the first and second light sensing elements change depending on the incidence angle of the incident light relative to the third straight line, the method comprising:

placing and die-bonding multiple pairs of the first and second light sensing elements on a lead frame or substrate;

for each pair of the first and second light sensing elements, connecting the first and second light sensing elements to the lead frame or substrate by wire-bonding;

for each pair of the first and second light sensing elements, encapsulating the first and second light sensing elements in a single body of light transmitting resin and molding the first and second light receiving lenses using a portion of the light transmitting resin; and for each pair of the first and second light sensing elements, cutting the lead frame or substrate apart to produce light angle detection devices.

12. A fabrication method for a light angle detection device, which is adapted to be provided with a first light receiving unit having a first light receiving lens collecting incident light and a first light sensing element receiving the incident light collected by the first light receiving lens and a second light receiving unit having a second light receiving lens collecting incident light and a second light sensing element receiving the incident light collected by the second light receiving lens, and in which the first light receiving lens, the first light sensing element, the second light receiving lens, and the second light sensing element are disposed such that a first straight line passing through a center of a light receiving surface of the first light sensing element and a vertex of the first light receiving lens, a second straight line passing through a center of a light receiving surface of the second light sensing element and a vertex of the second light receiving lens, and a third straight line passing through the center of the light receiving surface of the first light sensing element and the center of the light receiving surface of the second light sensing element form an isosceles triangle having the third straight line as its base, and the light sensing outputs of the first and second light sensing elements change depending on the incidence angle of the incident light relative to the third straight line, the method comprising:

placing and die-bonding multiple pairs of the first and second light sensing elements on a lead frame;

for each pair of the first and second light sensing elements, connecting the first and second light sensing elements to the lead frame by wire-bonding;

bending the lead frame such that both a normal passing through the center of the light receiving surface of the first light sensing element and a major axis of the first light receiving lens are aligned with the first straight line and both a normal passing through the center of the light receiving surface of the second light sensing element and a major axis of the second light receiving lens are aligned with the second straight line;

for each pair of the first and second light sensing elements, encapsulating the first and second light sensing elements in a single body of light transmitting resin and molding the first and second light receiving lenses using a portion of the light transmitting resin;

cutting the tie bars of the lead frame; and for each pair of the first and second light sensing elements, cutting the lead frame apart to produce light angle detection devices.

13. A fabrication method for a light angle detection device, which is adapted to be provided with a first light receiving unit having a first light receiving lens collecting incident light and a first light sensing element receiving the incident light collected by the first light receiving lens and a second light receiving unit having a second light receiving lens collecting incident light and a second light sensing element receiving the incident light collected by the second light receiving lens, and in which the first light receiving lens, the first light sensing element, the second light receiving lens, and the second light sensing element are disposed such that a first straight line passing through a center of a light receiving surface of the first light sensing element and a vertex of the first light receiving lens, a second straight line passing through a center of a light receiving surface of the second light sensing element and a vertex of the second light receiving lens, and a third straight line passing through the center of the light receiving surface of the first light sensing element and the center of the light receiving surface of the second light sensing element form an isosceles triangle having the third straight line as its base, and the light sensing outputs of the first and second light sensing elements change depending on the incidence angle of the incident light relative to the third straight line, the method comprising:

placing and die-bonding multiple light sensing elements on a lead frame;

for each light sensing element, connecting the light sensing element to the lead frame by wire-bonding;

for each light sensing element, encapsulating, in a single body of light transmitting resin, the light sensing element and a die-bonding portion of the lead frame for die-bonding the light sensing element to the lead frame and molding a light receiving lens using a portion of the light transmitting resin;

cutting the lead frame apart to separate it into multiple lead frames so as to include a light sensing element and a light receiving lens in the respective separated lead frames; and producing the light angle detection device by combining two separated lead frames and using the light sensing elements and the light receiving lenses of these lead frames as the first light sensing element, the second light sensing element, the first light receiving lens, and the second light receiving lens of the light angle detection device, and by disposing the two lead frames on the substrate parallel to the third straight line with a spacer sandwiched between the lead frames and the substrate so as to set the incline of the two lead frames with respect to the substrate.

\* \* \* \* \*